United States Patent
Madhow et al.

(10) Patent No.: US 10,175,363 B2
(45) Date of Patent: Jan. 8, 2019

(54) LOCALIZATION AND TRACKING USING LOCATION, SIGNAL STRENGTH, AND PSEUDORANGE DATA

(71) Applicant: Uber Technologies, Inc., San Francisco, CA (US)

(72) Inventors: Upamanyu Madhow, Santa Barbara, CA (US); Andrew Irish, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/659,536

(22) Filed: Jul. 25, 2017

(65) Prior Publication Data

US 2018/0074209 A1 Mar. 15, 2018

Related U.S. Application Data

(63) Continuation of application No. 15/396,297, filed on Dec. 30, 2016, now Pat. No. 9,766,349.

(Continued)

(51) Int. Cl.
*G01S 19/40* (2010.01)
*G01S 19/22* (2010.01)
(Continued)

(52) U.S. Cl.
CPC ............ *G01S 19/40* (2013.01); *G01S 19/11* (2013.01); *G01S 19/22* (2013.01); *G01S 19/42* (2013.01); *G01S 19/428* (2013.01)

(58) Field of Classification Search
CPC .......... G01S 19/40; G01S 19/11; G01S 19/22; G01S 19/42; G01S 19/428; G01S 19/09; G01S 19/48; G01S 19/05
(Continued)

(56) References Cited

U.S. PATENT DOCUMENTS

2010/0231445 A1 9/2010 Tarlow
2011/0291881 A1* 12/2011 Shirai ................ G01S 19/22
  342/357.25

(Continued)

FOREIGN PATENT DOCUMENTS

WO WO 2015/126499 A2 8/2015

OTHER PUBLICATIONS

Australian First Examination Report, Australian Application No. 2017200316, dated Mar. 31, 2017, 7 pages.
(Continued)

*Primary Examiner* — Harry K Liu
(74) *Attorney, Agent, or Firm* — Fenwick & West LLP

(57) ABSTRACT

A localization server improves position estimates of global navigation satellite systems (GNSS) using probabilistic shadow matching and pseudorange matching is disclosed herein. The localization server may utilize one or more of the following information: the locations of the satellites, the GNSS receiver's location estimate and associated estimated uncertainty, the reported pseudoranges of the satellites, the GNSS estimated clock bias, the SNRs of the satellites, and 3D environment information regarding the location of the receiver. The localization server utilizes a Bayesian framework to calculate an improved location estimate using the GNSS location fixes, pseudorange information, and satellite SNRs thereby improving localization and tracking for a user device.

20 Claims, 7 Drawing Sheets

Related U.S. Application Data

(60) Provisional application No. 62/394,703, filed on Sep. 14, 2016.

(51) Int. Cl.
   *G01S 19/42* (2010.01)
   *G01S 19/11* (2010.01)

(58) Field of Classification Search
   USPC .................................................. 342/357.23
   See application file for complete search history.

(56) References Cited

U.S. PATENT DOCUMENTS

| | | | | |
|---|---|---|---|---|
| 2012/0190369 | A1* | 7/2012 | Gao | G01S 19/48 |
| | | | | 455/436 |
| 2013/0265191 | A1* | 10/2013 | Ghinamo | G01S 19/40 |
| | | | | 342/357.23 |
| 2013/0285849 | A1 | 10/2013 | Ben-Moshe et al. | |
| 2015/0219769 | A1 | 8/2015 | Youssef et al. | |
| 2016/0259060 | A1 | 9/2016 | Kurby et al. | |
| 2016/0280401 | A1 | 9/2016 | Driscoll et al. | |
| 2016/0349362 | A1* | 12/2016 | Rohr | G01S 13/86 |
| 2016/0364990 | A1 | 12/2016 | Khaghani et al. | |
| 2017/0023659 | A1* | 1/2017 | Bruemmer | G01S 5/0252 |

OTHER PUBLICATIONS

Groves, GNSS shadow matching:, Sep. 2015,Institue of Navigation GNSS 2015+, 14-18, pp. 1-3, 7 and 10.

Wang, L. et al., 'Smartphone Shadow Matching for Better Cross-street GNSS Positioning in Urban Environments', University College London, Accepted for publication by The Journal of Navigation, The Royal Institute of Navigation 2014, pp. 1-25, doi:10.1017/S0373463314000836, [online], May be retrieved at <URL:http://discovery.ucl.ac.uk/1458626/6/ShadowMatching%20Accepted%20Manuscript%20JON%2014-15.pdf>.

Yozevitch, R. et al., 'A Robust Shadow Matching Algorithm for GNSS Positioning', Ariel University, Israel, Navigation: Journal of The Institute of Navigation, vol. 62, No. 2, Jun. 2015, [online], May be retrieved at <URL:https://www.researchgate.net/publication/280971734_A_Robust_Shadow_Matching_Algorithm_for_GNSS_Positioning>.

Preinterview First Office Action, U.S. Appl. No. 15/396,297, dated Feb. 15, 2017, 8 pages.

PCT International Search Report and Written Opinion, PCT Application No. PCT/IB2017/055581, dated Jan. 9, 2018, 14 pages.

Wang, L., "Kinematic GNSS Shadow Matching Using a Particle Filter," Proceedings of the 27th International Technical Meeting of the ION Satellite Division, ION GNSS+ 2014, Tampa Florida, Sep. 8, 2014, pp. 1907-1919.

* cited by examiner

LOCALIZATION AND TRACKING USING LOCATION, SIGNAL STRENGTH, AND PSEUDORANGE DATA

CROSS REFERENCE TO RELATED APPLICATIONS

This application is a continuation of U.S. application Ser. No. 15/396,297, filed Dec. 30, 2016, which claims the benefit of U.S. Provisional Application No. 62/394,703, filed Sep. 14, 2016, which is incorporated by reference in its entirety.

BACKGROUND

Global Navigation Satellite Systems (GNSS) include a constellation of satellites. Each satellite broadcasts signals containing information so that corresponding earth-based receivers that receive the signal can identify the satellite that generated the signal. Based on time of arrival measurements for signals from at least 4 satellites, a GNSS receiver estimates its three-dimensional (3D) location and its timing offset from the highly accurate clocks used by the satellites. This is a generalization of the concept of trilateration, and a key assumption is that the path from each satellite to the receiver is line of sight (LOS). However, GNSS localization quality is often degraded. This degradation is especially prevalent in urban areas, where the presence of tall buildings generates reflections of the received signals. Because the GNSS location estimate is based, at least in part, on how long it takes the signal to reach the device (i.e., so called "time-of-flight" measurements), reflections prove especially problematic in determining the GNSS position fix as the time-of-flight, and hence the pseudorange, will increase as a result of the reflection. These errors in pseudorange often lead to large errors in localization, for example, as much as 50 meters or more in high-rise urban environments. Even if the LOS path is available, the pseudorange may be corrupted by the presence of additional reflected paths.

Inaccuracies in GNSS in urban environments have a significant adverse impact in a large, and growing, number of settings. In addition to its traditional applications in transportation logistics, the use of GNSS has become ubiquitous with the advent of consumer mobile electronic devices. GNSS-based localization is relied upon by individual users for both pedestrian and vehicular navigation. Accurate global localization using GNSS also forms the basis for a variety of enterprises such as car services and delivery services. It is also a critical component in vehicular automation technology, with global location using GNSS providing an anchor for fine-grained localization and tracking using vehicular sensors and actuators.

A GNSS receiver has information about the signal-to-noise ratio (SNR) of each satellite it sees, which can be often obtained via a software interface. These SNRs, employed together with information about the propagation environment, can provide valuable information about location that supplements the standard GNSS position fix. In GNSS and other wireless communication, line-of-sight (LOS) channels are characterized by statistically higher received power levels than those in which the LOS signal component is blocked (e.g., non-LOS or NLOS channels). As a mobile GNSS receiver traverses an area, obstacles (e.g., buildings, trees, terrain) frequently block the LOS component of different satellite signals, resulting in NLOS channels characterized by statistically lower SNR. While the NLOS channels cannot be relied upon to determine the position fix of the user device, the decrease in SNR does provide information regarding the location of the device; namely, that the device is within the shadow of a building/infrastructure. Thus, the satellite SNRs yield probabilistic information regarding the receiver's location: higher SNR indicates that the path from the receiver to the satellite is likely LOS, while lower SNR indicates that the path from the receiver to the satellite is likely NLOS. Having knowledge of the layout/map of the urban environment, the satellite SNR signal can be utilized to determine possible locations for the user device based on calculation of positions that would likely be "blocked" or in the shadow of various buildings or structures. Such a procedure for extracting location information from satellite SNRs is termed "shadow matching."

Figure 1:
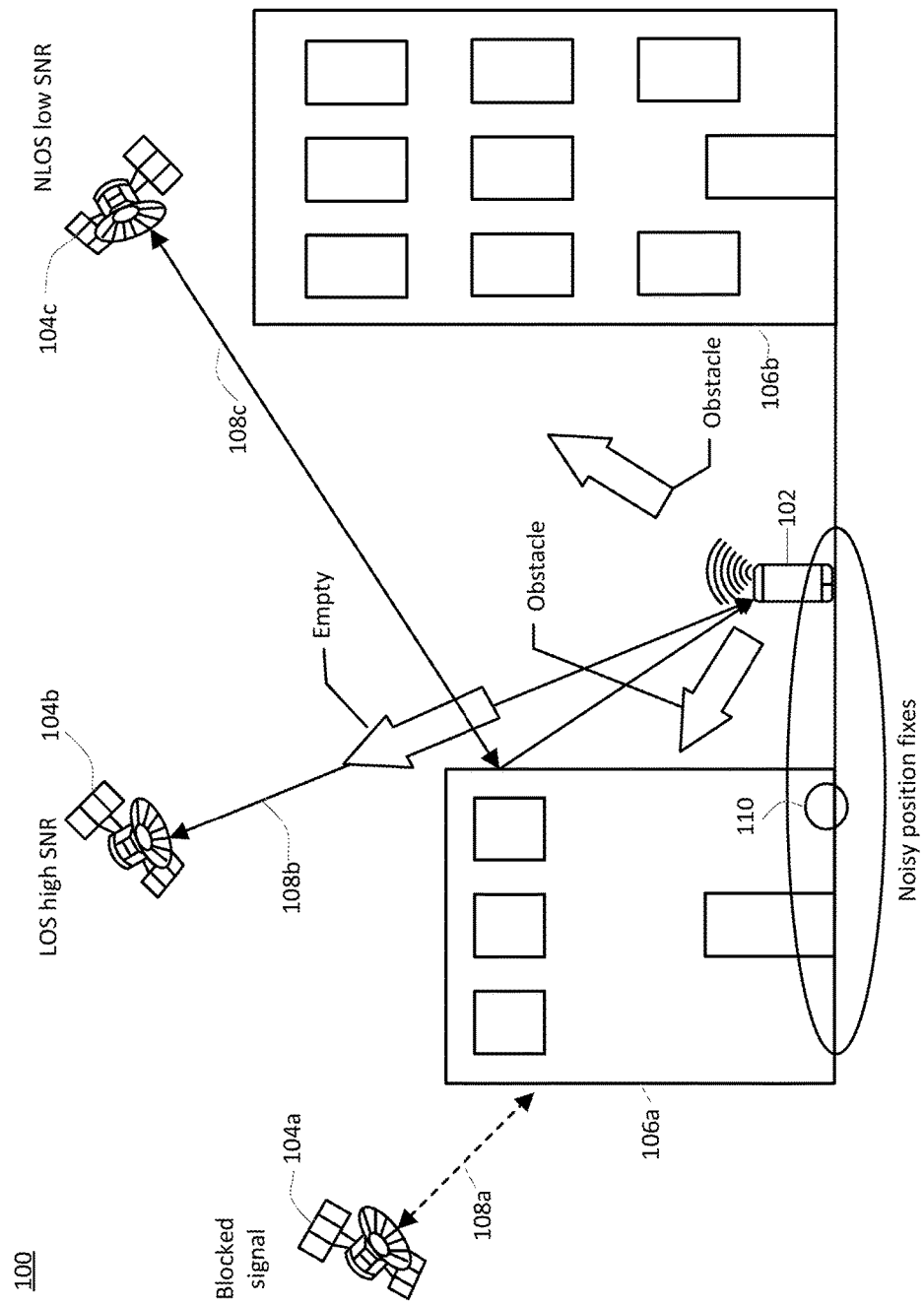
FIG. 1 is a schematic diagram of a localization and tracking system in accordance with one embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Although probabilistic shadow matching may improve a GNSS location estimate by utilizing the likelihood that a receiver is in the shadow of a structure to better estimate the location of the receiver, techniques do not incorporate the improved location information in order to correct inaccurate pseudorange information. Furthermore, models for improving localization do not utilize other GNSS provided information including Doppler shift and carrier phase estimates provided along with pseudorange data. Thus, it would be desirable to develop a framework for incorporating additional GNSS information into a probabilistic shadow matching model.

Incorporating additional GNSS information offers a number of advantages over the art. While shadow matching using satellite SNRs provides valuable location information that can improve the standard GNSS location estimate, the information from shadow matching is noisy. Specifically, high SNR could be obtained for NLOS paths due to strong reflections, while low SNR could be obtained for LOS paths due to multipath interference. Thus, SNR based shadow matching may work poorly in complex propagation environments.

Examples of systems and methods of improving position estimates of GNSS using probabilistic shadow matching and pseudorange matching are disclosed herein. The improvements can be significant in urban areas where GNSS position fixes could become inaccurate due to LOS blockage and multipath propagation. While example embodiments are described in the context of GNSS, it will be appreciated that the disclosure is not limited to GNSS and that any suitable location system can be used in alternative embodiments.

The localization and tracking algorithms disclosed here may utilize one or more of the following information: the locations of the satellites, the GNSS receiver's location estimate and associated estimated uncertainty, the reported pseudoranges of the satellites, the GNSS estimated clock bias, the SNRs of the satellites, and information indicative of aspects of the 3D environment surrounding the receiver.

The term "pseudorange" as used herein refers to the a set of ranges between the receiver device and each satellite from which the receiver device has received a position signal, where each range is assumed by the GNSS receiver to have the same error due to the clock bias of the receiver device.

The term "clock bias" as used herein refers to the time error of the receiver device clock from the earth reference frame time assumed by the GNSS. Clock bias is caused by drift in the clocks of receiver devices (usually quartz clocks) from the more accurate atomic clocks used on GNSS satellites.

The term "SNR" refers to the signal-to-noise ratio of each satellite signal received at the receiver device. Any other GNSS reported signal strength metric may also be utilized if available.

Information regarding the 3D environment, which can be provided in a number of ways, enables probabilistic shadow matching. Such information may be provided in terms of a 3D map, in which space is divided into volumetric pixels, or "voxels," and the probability of each voxel being occupied is specified. Triangulated meshes or other vector based 3D maps may also be used. Alternatively, statistical information on building heights, together with 2D maps and road network data, can also provide the 3D information required for probabilistic shadow matching.

A Bayesian framework is employed to fuse the GNSS location fixes, pseudorange information, and satellite SNRs for localization and tracking. For instance, the raw GNSS location estimates, the pseudorange data from each satellite, and the SNRs from each satellite constitute the measurements driving a nonlinear filter in an example embodiment.

The nonlinear filtering algorithms disclosed here fall under the general framework of particle filtering, where importance sampling is included in each filtering step. However, modifications can be made to handle the difficulties unique to the problem of urban localization.

In particular, the GNSS system includes a modified particle filter that provides a mechanism for selecting particles to include in the analysis set. Several different mechanisms can be used, each mechanism with different benefits. For example, in one embodiment, a measurement model employed by the GNSS system acts to increase "uncertainty" in the GNSS particle fix created by the measurement model based on the correlation between successive GNSS fix data. The increase in uncertainty hinders or prevents the GNSS fix from narrowing the particle set down to a specific area, and allows for the possibility that the GNSS fix is the result of a NLOS reflection that resulted in a bad position update. Increasing the uncertainty allows the region outside of this local maximum to be explored by the particle filter and therefore allows for the possibility that the correct position fix will be located.

In another embodiment, the measurement model increases uncertainty based on how built up the environment is. In this way several solutions are presented for allowing a particle filter to explore the space around the reported GNSS fix under the right circumstances to prevent the output estimate from becoming trapped in the wrong location.

In another embodiment, a modified particle filter is utilized that provides a mechanism for selecting particles (outside of the normal selection process) for inclusion in the particle set analyzed. Once again, this has the effect of allowing the particle filter to explore the 3D space surrounding the GNSS fix position, thus allowing the particle filter to avoid becoming captured in local maximums. A number of other features are described herein to provide and/or improve the functionality of GNSS localization and tracking, particularly in urban environment.

FIG. 1 is a schematic diagram of a localization and tracking system 100 according to an embodiment of the present invention. System 100 includes mobile device 102, satellites 104a, 104b, and 104c, and buildings/obstacles 106a and 106b. More than three satellites can be utilized, and four or more satellites can be used to estimate clock bias, but for purposes of presenting the problem associated with generating a location estimate in an urban environment only three satellites are shown. In the embodiment, shown in FIG. 1, mobile device 102 is a device capable of receiving GNSS data from one or more of the plurality of satellites. In addition, mobile device 102 is capable of measuring an attribute of the GNSS signal provided by each of the plurality of satellites 104. For example, in one embodiment mobile device 102 monitors pseudorange estimate and the SNR of the received GNSS data. Although a smartphone is one example of a device capable of interfacing with satellites 104 as part of a GNSS, other types of mobile devices such as tablets, watches, etc., as well as navigation units in automobiles, may be utilized.

The term "received" as used herein may refer to the receipt of data that has been transmitted from one device to another (e.g. between a GNSS satellite and mobile device 102, between mobile device 102 and a cloud-based server) or the receipt of data from one entity within the same device to another (e.g. a processor receiving position fix data from a GPS receiver of the same mobile device). Finally, "received" may refer to the transmission of data between software programs running on the same processor or between a storage device and a processor on the same device.

In one embodiment, processing of the monitored GNSS data, pseudorange data, and SNR data is performed locally by mobile device 102. However, in other embodiments mobile device 102 communicates the received GNSS data, pseudorange, and SNR data to a cloud-based localization server (shown in FIG. 2), which analyzes the data and returns a localization estimate to mobile device 102. During normal operation (e.g., in environments, such as non-urban environments, wherein multipath does not significantly interfere with location determination), the location of device 102, along with its clock bias, is determined based on the time-of-flight of signals received from multiple satellites. For example, if buildings 106a and 106b were not present, then the position of mobile device 102 could be triangulated based on the time of flight of signals 108a, 108b, and 108c (e.g., setting clock bias to zero for simplicity of exposition), wherein time of flight is utilized to determine a distance of mobile device 102 from each of the plurality of satellites 104a, 104b, and 104c. FIG. 1 illustrates how the presence of buildings 106a and 106b may result in a noisy position estimate. In this particular example, signal 108a provided by satellite 104a is completely blocked by building 106a, and thus no information is obtained regarding the location of mobile device 102. For purposes of this discussion, signal 108a is described as a "blocked signal". Signal 108c provided by satellite 104c is not completely blocked, but the path between satellite 104c and mobile device 102 includes at least one reflection—in this case a reflection off of building 106a. For purposes of this discussion, signal 108c is a "non-line-of-sight" (NLOS) signal. The reflection results in an increase in the time-of-flight of signal. This affects the GNSS reported pseudorange of the satellite 108c as compared to pseudorange calculated based on a direct path between communication between the satellite 104 and mobile device 102. Additionally, the reflection or partial blockage of a signal causes a decrease in the SNR of signal 108c. Without taking into account the decrease in SNR, location estimates based on signal 108c will tend to overestimate the distance of mobile device 102 from satellite 104c because the reported pseudoranges are calculated based on the assumption of a LOS path. The result, in the illustrated case, is an erroneous GNSS fix at point 110, located some distance to the left of the user's actual location.

Figure 2:
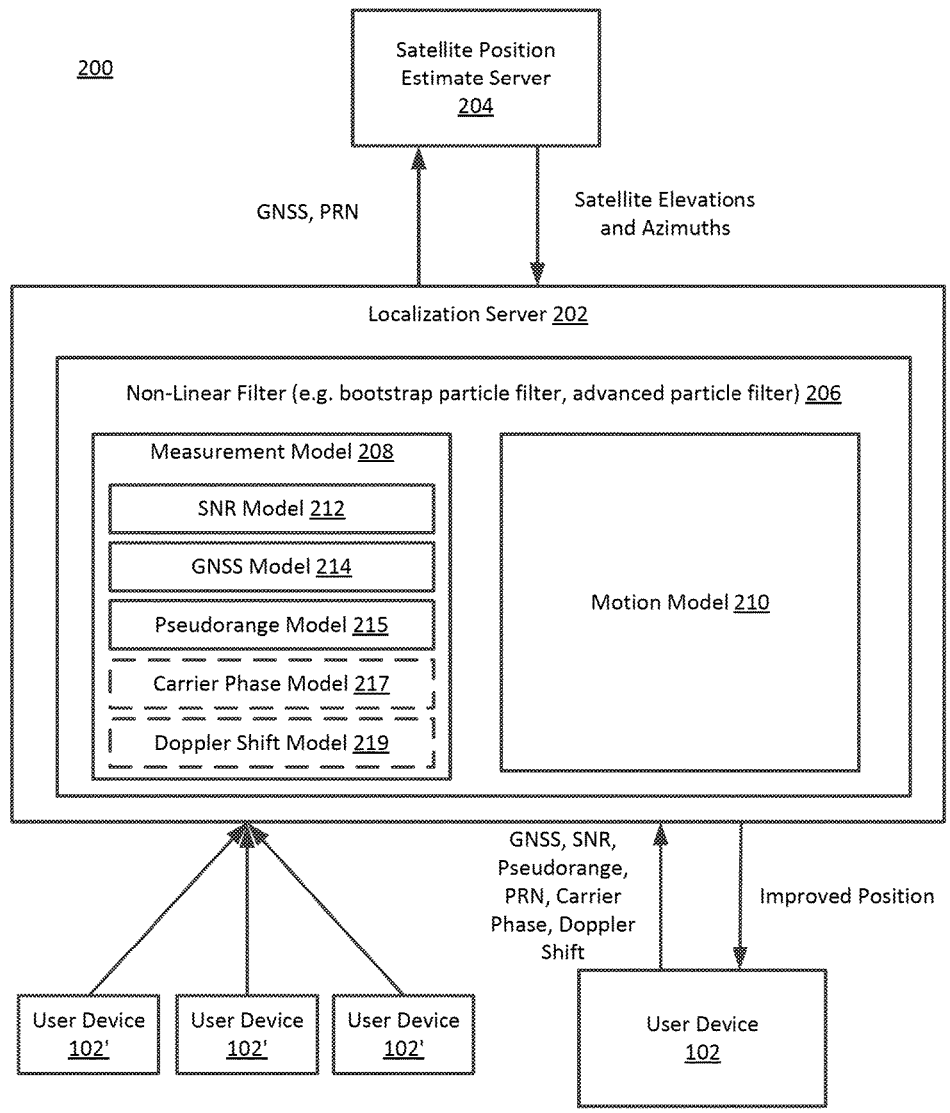
FIG. 2 is a block diagram of the localization and tracking system in accordance with one embodiment.

FIG. 2 is a block diagram of the localization and tracking system 200 according to one embodiment. In the embodiment shown in FIG. 2, system 200 includes localization server 202, which in turn includes non-linear filter 206, measurement model(s) 208 and motion model 210, and satellite position estimate server 204. Location server 202 may include one or more processors and memory for implementing and storing non-linear filter 206 and associated models. In addition, while the embodiment shown in FIG. 2 processes information remotely from user device 102, in other embodiments the functions and analysis performed by localization server 202 may be implemented locally by user device 102.

In the embodiment shown in FIG. 2, user device 102 (along with other user devices 102') provide GNSS position data, calculated pseudorange data, measured SNR data for each satellite signal received, pseudo-random noise (PRN) code identifying each of the satellites communicating with a particular user device 102, and optionally the coordinates (e.g., azimuth and elevation) for each satellite signal received. In some embodiments, calculated clock bias for user device 102 is also provided. The information provided by user device 102, including GNSS position data, pseudorange data, SNR data, and PRN data, is available from a number of GNSS capable devices.

Localization server implements a non-linear filter (e.g., particle filter) 206 to fuse received measurement data, including GNSS position fix data, pseudorange data, and SNR data, to compute a conditional distribution of a user position. To do this, nonlinear filter 206 utilizes motion model 210 to predict the movement of the target or user being tracked, and measurement model 208 to model how the current measurement is related to the current state. In one embodiment, the motion model is expressed as $$x_t = f(x_{t-1}, u_t)$$

which maps the previous state $x_{t-1}$ (e.g., position and velocity of the target) and a control $u_t$ to the current state $x_t$. In one embodiment, $u_t$ is modeled as a complete unknown (e.g., modeled as zero mean noise) to model the situation that no information regarding the intent of the target/user is available. In other embodiments, additional information may be available and $u_t$ may be modeled to reflect that information. In addition, the measurement model is expressed as $$[y_t, z_t, r_t] = g(x_t, v_t)$$

which maps the current state $x_t$ and random noise $v_t$ to the observed GNSS fix (e.g., position) $y_t$, $N_t$ SNR measurements $z_t = [z_{t,1}, \ldots, z_{t,N_t}]^T$, and $N_t$ pseudorange measurements $r_t = [r_{t,1}, \ldots, r_{t,N_t}]^T$. $N_t$ refers to the number of individual satellite signals received at a given state t. In some embodiments, in addition to the physical state $x_t$ of a user device the measurement model may have an additional state variable, $\tau_t$, representing the clock bias of a user device.

Given measurement model 208 and motion model 210, non-linear filter 206 (e.g., a modified particle filter) is utilized to determine the probability of a particular receiver state (e.g., position $x_t$) conditioned on all previous GNSS, SNR, and pseudorange measurements. Thus, measurement model 208 is a posterior distribution modeled as a set of K particles, each particle representing a hypothesized device location. The measurement model 208 may be expressed as follows:

$$p(x_t | y_{1:t}, z_{1:t}, r_{1:t}) = \sum_{k=1}^{K} w_t^{(k)} \delta_{x_t^{(k)}}(x_t)$$

wherein $w_t^{(k)}$ represents a weight and $x_t^{(k)}$ a state (e.g., position and velocity) associated with each of the plurality of K particles, wherein $\delta_a(b)$ is the Dirac measure (equals 1 if a=b and 0 otherwise), and wherein $y_{1:t}, z_{1:t}, r_{1:t}$ refer to all the measurements from time 1 (the initial time) to time instant t. Although a particle filter is particularly adept in handling multi-modal distributions generated as a result of arbitrarily shaped satellite shadows, other non-linear filters may be utilized.

Motion Model

As discussed above, the motion model is utilized to predict possible locations of a user device being tracked. That is, given a plurality of possible locations in a previous time step, the motion model 210 predicts possible particle locations (representing potential user device locations) in the next time step given what knowledge is available regarding the intent, speed, or direction of the user.

In one embodiment, the motion model is constructed to describe continuous horizontal (2D) motion within a 3D space. For example, the state x of a pedestrian user can be described as $x = [s_x, \dot{s}_x, s_y, \dot{s}_y, s_z]$ wherein $s_e$ and $\dot{s}_e$ refer to the position and velocity along axis e. In one embodiment, the above motion model 210 is utilized to represent the motion of pedestrians. In other embodiments, the motion model may be modified to represent the movement of vehicles by including information regarding how vehicles are allowed to move, including constraints such as how quickly a vehicle is allowed to turn $\omega$ and whether the vehicle whether the vehicle is allowed to leave the road. In addition, the motion model may be extended to track objects capable of moving through 3D space (e.g., drones, airplanes, people in buildings etc.).

In one embodiment, the motion model 210 models the possible position coordinates as particles and non-position coordinates (e.g., velocity) as distributions (e.g., Gaussians) such that the motion model can be expressed as follows:

$$p(x_t | y_{1:t}, z_{1:t}, r_{1:t}) = \sum_{k=1}^{K} w_t^{(k)} N(x_t | x_t^{(k)}, A_t)$$

wherein the covariance matrix $A_t$ is singular in the position dimensions, and wherein $N(\bullet | m, C)$ defines a multivariate Gaussian distribution, with mean m and covariance matrix C. A baseline motion model is one with Gaussian dynamics:

$$x_t = \Phi_t x_{t-1} + u_t$$

wherein $\Phi_t$ is the state transition matrix and $u_t \sim N(0, Q_t)$ is multivariate process noise. In one embodiment times t and t−1 are separated by about one second. In addition, in one embodiment the pedestrian and vehicular models utilize a Nearly Constant Velocity (NCV) model. The framework is generally applicable to the form:

$$x_t = f(x_{t-1}) + u(x_{t-1})$$

wherein $u(x_{t-1})$ is Gaussian.

Measurement Model

As discussed above, the measurement model 208 acts to map the current state $x_t$ and random noise $v_t$ to the observed GNSS position estimate $y_t$, $N_t$ SNR measurements $z_t = [z_{t,1}, \ldots, z_{t,N_t}]^T$, and $N_t$ pseudorange estimates $jr_t = [r_{t,1}, \ldots, r_{t,N_t}]^T$. In some embodiments, the measurement model 208 may additionally utilize carrier phase estimates and Doppler shift estimates. The measurement model 208 determines the probability of a particle being located at various locations (e.g., locations corresponding to hypothetical positions for each generated particle) given received measurement data. Therefore, the measurement model 208 comprises several individual models to handle each of the measurement inputs. This may include a GNSS position model 214, a SNR model 214, and a pseudorange model 215. Thus, the measurement model may be described as $$p(y_t, z_t, r_t | x_t, \tau_t) = p(y_t | x_t) p(z_t | x_t) p(r_t | x_t, \tau_t)$$

wherein $\tau_t$ is an additional state variable for the clock bias of a particle representing a hypothetical position of user device. Note that the overall posterior probability function is dependent on $\tau_t$ due to the inclusion of the pseudorange model 215 $p(r_t | x_t, \tau_t)$, as the pseudorange varies with the clock bias.

GNSS Positions Estimate Model

Typically, the GNSS position fix is given as $y_t = H x_t + e_t$, where the covariance of the error $e_t$ is estimated using standard Dilution of Precision computations, and where H is the measurement matrix which serves to capture the position (and possibly velocity) coordinates of the state. However, these computations assume that signals received by user device 102 are LOS, as opposed to strong reflections with the LOS path blocked. To account for the possibility of outliers generated as a result of strong reflections (signals having relatively high SNR values, despite a NLOS path), the GNSS position estimate model 214 is modified by modeling the GNSS position fix as a mixture of a reported Gaussian $\tilde{y} \sim N(x_t, C_t)$ and an outlier vector $e_t$, which is derived from a broader multivariate elliptical distribution, such that $$y_t = (1-\alpha) \tilde{y} + \alpha e_t$$

where $\alpha$ is the outlier probability and $C_t$ is the estimated covariance based on Dilution of Precision techniques. In one embodiment, the outlier probability $\alpha$ is coarsely adapted by scenario (e.g., adjusted based on the environment, with the value of $\alpha$ increasing for more built-up environments likely to generate more outlier conditions). In this way, the measurement model 208 is modified using an adaptive outlier model to allow the GNSS position estimate to be given less weight when the user is located within an environment assigned a high value of $\alpha$ (e.g., built-up environment) to account for the likely errors generated as a result of strong reflections.

In one embodiment, the GNSS position estimate model 214 may be further modified with respect to vehicle measurements using a road matching model. In general, because vehicles are confined (for the most part) to operate on streets, a pseudo measurement vector of possible street assignments that varies by particle location may be added. For example, in one embodiment a measurement vector is provided of possible street assignments that varies by particle location and is denoted $\zeta_t^{(k)} = [\zeta_{t,1}^{(k)}, \ldots, \zeta_{t,M_t}^{(k)}]$ for the kth particle. Although not a measurement in the usual sense, this is referred to as the road matching prior and is utilized to further determine the likely position of a particle based on the assumption that a vehicle is located on a street. In this embodiment, the measurement model 208 then becomes, in terms of likelihoods for particle $x_t^{(k)}$, $$p(y_t, z_t, \zeta_t^{(k)} | x_t^{(k)}) = p(\zeta_t^{(k)} | x_t^{(k)}) p(y_t | x_t^{(k)}) \prod_n p(z_{t,n} | x_t^{(k)})$$

where independence of the observation given the current state is assumed. However, the road matching prior is not factored into the product of its components. Instead, the conditional probability associated with each particle is selected based on a maximum over individual assignment likelihoods such that each particle is assigned a "best explanation".

$$p(\zeta_t^{(k)} | x_t^{(k)}) = \max\left\{\max_i p(\zeta_{t,i}^{(k)} | x_t^{(k)}), \epsilon\right\}$$

In other embodiments, rather than utilize a maximum value, the values may be summed to determine the most likely location. However, one potential drawback of this arrangement is that more than one street assignment may be assigned when the vehicle is located at an intersection. In another embodiment, a minimum likelihood value e is also included in the vehicle motion model to prevent the road matching element $\zeta_t^{(k)}$ from becoming too influential as compared with other measurements. In still other embodiments, rather than classify a vehicle as located on a particular street or not, determinations are made regarding the particular lane on which the vehicle is located.

SNR Measurement Model

With respect to the received SNR measurements, the goal is to determine the likelihood of a particle being located at a particular position $x_t$ given the observed SNR measurement $z_t$ and what we know about the environment. In particular, SNR measurements provide information regarding whether a signal is LOS or NLOS. In addition, if 3D information is available regarding the urban environment, along with satellite location data, the location of various particle locations can be analyzed to determine whether it is likely that the signal will be blocked. This combination of SNR measurement data that indicates whether or not a signal is blocked and information regarding the probability of various locations being blocked allows for determinations to be made regarding how likely it is for a user device to be located at a particular location. For example, an SNR measurement indicating a LOS signal provides information regarding the likely location of the user based on 3D knowledge of the environment. For particle locations $x_t$ determined to be in the "shadow" of a building with respect to a particular satellite the conditional probability of receiving a SNR measurement indicating a LOS path is fairly low. Conversely, for particle locations $x_t$ determined not to have any structures located between the user device and the satellite, the conditional probability of receiving a SNR measurement indicating a LOS path is fairly high. In this embodiment, a 3D map is included to allow determinations to be made regarding whether a user device is located in the "shadow" of a structure such as a building. However, as discussed in more detail below in other embodiments in which no 3D map is available, another shadow matching technique may be utilized in which information regarding the height/density of buildings/structures within a region are utilized to estimate the conditional probability of a particle being located at a particular location given the measured SNR signal.

In an embodiment, however, SNR model 212 includes a 3D map m comprising an occupancy grid having a plurality of binary-valued "voxels" or "cells", wherein cell $m_i=1$ if the ith cell is occupied by something (e.g., buildings), and $m_i=0$ if the ith cell is unoccupied (e.g., empty space). In some embodiments, cells are not assigned a "hard" zero or one, but rather are associated an occupancy probability $o(m)=\{p(m_i=1)\}_i$, which is treated like measurement data. In this way, a 3D map is constructed that allows determinations to be made regarding the likelihood of a particle being located in the presence of a building (e.g., in the shadow).

SNR measurements for the nth satellite at time t is denoted by $z_{t,n}$, $n=1, \ldots, N_t$ where $N_t$ represents the number of satellites in view. In the embodiment shown in FIG. 2, user device 102 also provides PRN information that identifies the satellites for which SNR data is received. In this embodiment, PRN information provided to localization server 202 is provided to satellite position estimate server 204, which in response provides satellite elevation and azimuth data $[\theta_{t,n}, \phi_{t,n}]$ which is considered noiseless. In other embodiments, user device 102 may provide satellite elevation and azimuth data $[\theta_{t,n}, \phi_{t,n}]$ based on information received from the satellite, while in still other embodiments localization server 202 maintains this information locally. Based on a hypothesized location $x_t$ of a user (e.g., particle), a ray extending from this location to the satellite is determined to be LOS if only unoccupied cells are crossed. In contrast, if a ray passes through at least one occupied cell, it is classified as NLOS.

Figure 5:
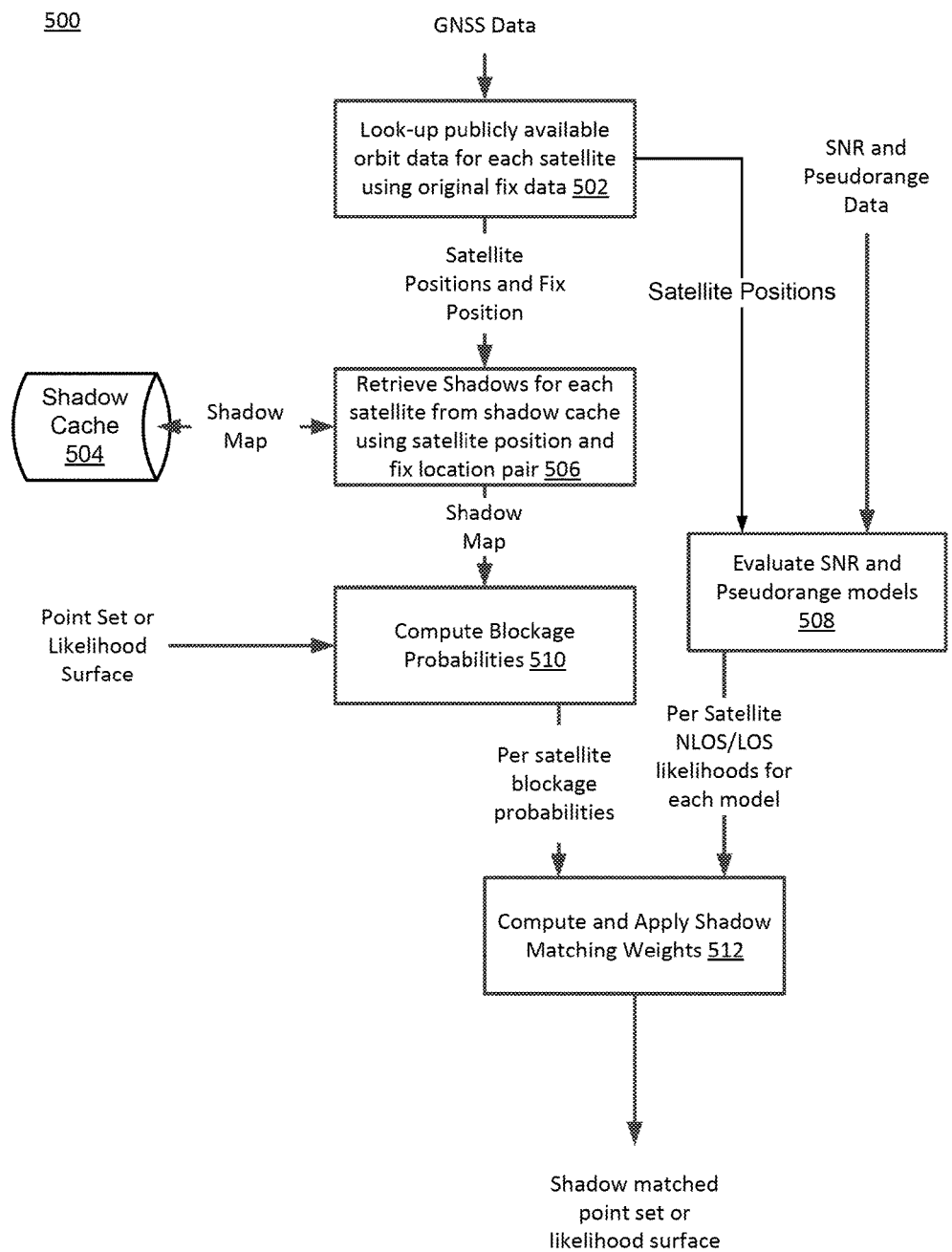
FIG. 5 is a flowchart that illustrates steps performed by the localization server using joint shadow, SNR, and pseudorange matching in accordance with one embodiment.

In some embodiments, the user device receives data indicative of the global satellite coordinates $x_{t,n}$ in addition to the elevation and azimuthal data. Alternatively, satellite coordinates may be determined using publicly available orbit data for the satellite. Given satellite coordinates $x_{t,n}$ the "shadows" (e.g., NLOS positions) in m associated with that position can be cached at the localization server 202. By pre-computing shadow maps and caching them by satellite coordinate $x_{t,n}$, the localization server 202 may perform a look-up operation given $x_{t,n}$ and a particle position $x_t$ instead of performing ray tracing operations between the two positions. This saves valuable computational time while still providing an estimate of the probability that the signal from the satellite to the particle position is LOS. FIG. 5 illustrates the use of a shadow cache in an SNR model and is discussed in a later section.

In one embodiment, a shadow matching cache maintains bins identifying possible ephemeris location data for available satellites, and calculates and stores for each ephemeris bin a blockage probability for corresponding locations x, which can be provided to the non-linear filter to estimate the conditional probability of a particle being located at a particular location given the measured SNR and pseudorange signals.

While in some embodiments a threshold could be utilized to determine whether a measured SNR signal represents a LOS signal path or NLOS signal path, in this embodiment the probability of measured SNR signal representing a LOS path or NLOS path is expressed as separate distributions.

For example, in one embodiment a LOS path is expressed as a Rician distribution, in which the distribution is centered around a relatively high SNR value and has a lower spread. Conversely, an NLOS path may be expressed as a log-normal distribution having a smaller mean and higher spread. For example, the Rician distribution can be expressed as:

$$f_{los}(r_{dB}) = \frac{\ln(10)}{20} 10^{r_{dB}/20} f_{Rice}(10^{r_{dB}/20})$$

wherein $$f_{Rice}(r) = \frac{2(K_R+1)r}{\hat{\Omega}} \exp\left(-K_R - \frac{(K_R+1)r^2}{\hat{\Omega}}\right) \times I_0\left(2\sqrt{\frac{K_R(K_R+1)}{\hat{\Omega}}}\, r\right),$$
$$r \geq 0$$

is the Rician fading density, $I_0(\cdot)$ is the $0^{th}$ order modified Bessel function of the first kind, $\hat{\Omega}$ is the estimated total channel power, and $K_R$ is the Rician "K factor" (ratio of LOS to diffuse power). With respect to the NLOS log-normal fading model, it is described by a normal distribution with mean $\mu$ and variance $\sigma^2$ in decibels.

Assuming map m does not change the SNR measurements can be modeled as conditionally independent given the map and poses, yielding the following factorization:

$$P(z\mid m, x) = \prod_{t,n} p(z_{t,n}\mid m, x_t)$$

However, the SNR of a given GNSS signal can depend on a number of factors such as environmental parameters and satellite elevation, and a number of useful statistical models may be utilized to model these factors, such as Land to Mobile Satellite (LMS) channels of interests. However, a simplification of an inference algorithm is obtained using the following sensor model:

$$p(z_{t,n}|x_t^{(k)}, o(m)) = p f_{los}(z_{t,n}) + (1-p) f_{nlos}(z_{t,n})$$

where $f_{los}$ and $f_{nlos}$ are the LOS and NLOS likelihoods respectively and $$p = \prod_{i \in \mathcal{M}(t,n,k)} p(m_i = 0)$$

where $\mathcal{M}(t, n, k)$ indexes the set of cells intersected. That is, if one cell is identified as occupied then all cells associated with that particle-satellite ray trace are identified as occupied and do not required additional analysis of other cells/voxels. This can reduce computational complexity, while providing good performance. In another embodiment, additional improvements may be obtained by including in the LOS/NLOS distribution a dependence on satellite elevation, wherein satellites at higher elevations are presumed to provide a greater LOS likelihood.

In general, a log normal shadowing model is used for NLOS distributions and Nakagami or Rician multipath fading model is used for the LOS distribution. However, in other embodiments other models may be utilized, including composite multipath and shadow fading models such as Generalized-K for NLOS distributions. In another embodiment, the LOS model is provided as follows:

$$f_{los}(z_{t,n})=(1-\beta)f_{los}^{nom}(z_{t,n})+\beta f_{los}^{noise}(z_{t,n})$$

where $f_{los}^{nom}$ is the nominal (Rician or Nakagami) distribution and $f_{los}^{noise}$ is the noise distribution, which has been taken to be either uniform over the SNR dynamic range or the nominal NLOS distribution (sometimes referred to as the "confusion" or "swap" model).

In this way, SNR measurement model 212 provides a simplified method of calculating the (conditional) likelihood of a particular being located at a particular location $x_t$ given SNR measurements $z_t$ and occupancy map $o(m)$.

Pseudorange Measurement Model

The goal of the pseudorange measurement model 215, like the SNR measurement model, is to determine the likelihood of a particle being located at a position $x_t$. However, the pseudorange measurement model 215 is further dependent on the additional state variable, clock bias $\tau_t$. Thus, the pseudorange measurement model 215 determines the likelihood of a user device being located at particle position $x_t$ with particle clock bias $\tau_t$ given pseudorange data $r_t$. The pseudorange estimate given by a satellite at time t is equal to the estimated distance between the user device and the satellite including the clock bias of the user device assuming LOS between the user device and the satellite. Therefore, in LOS conditions the pseudorange of satellite n can be expressed as follows $$r_n = R_n + c\tau + \epsilon$$

where $R_n$ is the actual straight line distance between satellite n and the user device, c is the speed of light, $\tau$ is the clock bias of the user device and $\epsilon$ is zero-mean measurement noise. The estimated pseudorange for each satellite is also dependent on a variety of ionospheric effects, however for the purposes of this model these are assumed to be accounted for by the GNSS receiver.

Pseudorange data from at least four satellites can be used by the GNSS receiver to estimate the clock bias using the standard least squares method. The estimated position of the user device may then be triangulated using the ranges $R_n$. The above equality for pseudorange, however, holds true when there is LOS between the user device and the satellite. For example, if the signal between the user device and the satellite n is reflected off of at least one surface before being received at the user device (e.g., 108c) the pseudorange is instead expressed as $$r_n = R_n + \Delta_n + c\tau + \epsilon$$

wherein $\Delta_n$ is the additional signal path length due to the reflection. Because the relationship between pseudorange $r_n$ and the actual distance $R_n$ varies depending the LOS condition, any pseudorange measurement model 215 would benefit from conditioning based on the shadow matching technique described in association with the SNR measurement model 212, wherein the SNR measurement model 212 was conditioned based on the likelihood p that a particle $x_t$ is LOS. Thus, the pseudorange measurement model 215 may be expressed as follows $$p(r_{t,n}|x_t^{(k)}, \tau_t^{(k)}, o(m)) = pf_{los}(r_{t,n}|x_t^{(k)}, \tau_t^{(k)}) + (1-p)f_{nlos}(r_{t,n}|x_t^{(k)}, \tau_t^{(k)})$$

The shadow matching algorithm used to calculate p is already described, therefore the likelihood computation requires an algorithm for $f_{los}(r_{t,n}|x_t^{(k)}, \tau_t^{(k)})$, the conditional density of the pseudorange assuming LOS between particle location $x_t$ and satellite n, and for $f_{nlos}(r_{t,n}|x_t^{(k)}, \tau_t^{(k)})$, the conditional density of the pseudorange assuming an indirect path. Depending on the embodiment, varying methods of conditioning the pseudorange measurement model 215 on clock bias $\tau$ may be used. These methods are described in full in a following section.

LOS Pseudorange Conditional Distribution

For a given particle location $x_t$ and particle clock bias $\tau_t$ the LOS pseudorange is given by $$r_{t,n} = L_{t,n} + c\tau_t + \epsilon$$

wherein $L_{t,n} = \|x_t - x_{t,n}\|$ is the length of the direct path between particle location $x_t$ and satellite location $x_{t,n}$ (where satellite n was located when it transmitted the signal that the pseudorange measurement $r_{t,n}$ was taken from). If the pseudorange measurement has a variance $\sigma_r^2$ (which may be reported by the GNSS receiver), then one possible model for LOS pseudorange conditional distribution is a Gaussian with mean equal to $L_{t,n} + c\tau_t$ and variance $\sigma_r^2$. That is, $$f_{los}(r_{t,n}|x_t, \tau_t) = N(r_{t,n}|L_{t,n} + c\tau_t, \sigma_r^2)$$

Other $f_{los}(r_{t,n}|x_t, \tau_t)$ distributions are also possible such as those that account for measurement outliers.

NLOS Pseudorange Conditional Distribution

When the LOS between a user device and a satellite is blocked the GNSS receiver in the device may lock on to a strong reflection of the signal. Depending on the environment surrounding the user device, the signal may reflect one or more times before being received at the user device. However, because each reflection causes a reduction in received signal strength, a signal that has reflected more than one time should be a negligible portion of the total received signal. Thus, omitting second or higher order reflections (e.g., where a signal is reflected multiple times) in the NLOS pseudorange model can reduce computational complexity without significant loss in performance. The NLOS pseudorange may be given by $$r_{t,n} = L_{t,n} + \Delta_{t,n} + c\tau_t + \epsilon$$

wherein $\Delta_{t,n}$ is the additional signal path length due to the reflection. Given particle position $x_t$ and satellite position $x_{t,n}$, the straight-line distance can be calculated as $L_{t,n} = \|x_t - x_{t,n}\|$. Thus, assuming state variable $\tau_t$ as given, an expression for $\Delta_{t,n}$ can be used to evaluate the NLOS pseudorange model.

Figure 7:
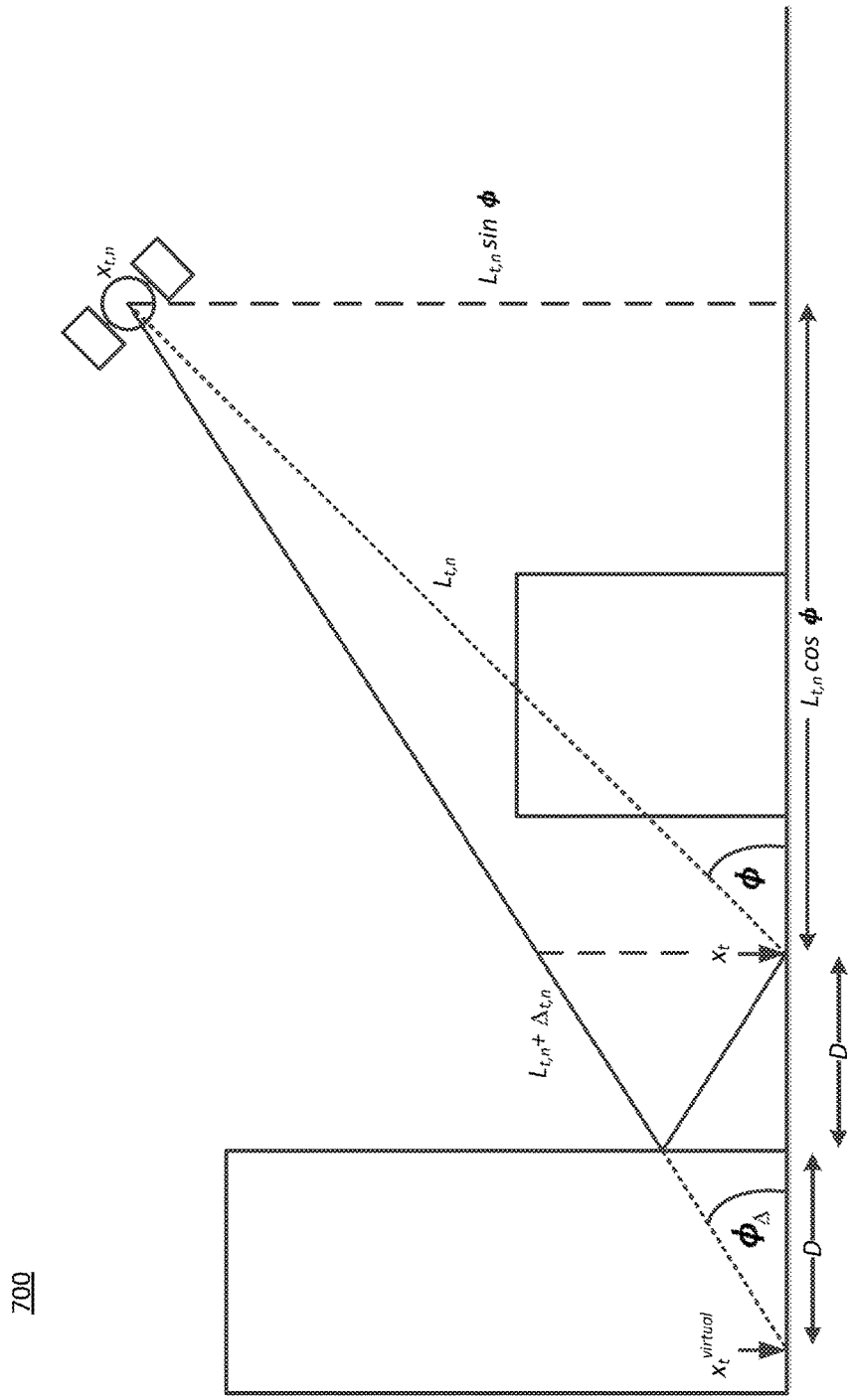
FIG. 7 is a schematic diagram illustrating the calculation of the length of a reflected signal path in accordance with one embodiment.

Referring to the geometric diagram 700 of FIG. 7, a geometric relationship between $L_{t,n}$ can be derived. FIG. 7 illustrates that the reflected path between the particle location $x_t$ and satellite location $x_{t,n}$ is equal to the straight-line path between a virtual receiver and the satellite location $x_{t,n}$ or $$\|x_t^{virtual} - x_{t,n}\| = L_{t,n} + \Delta_{t,n}$$

FIG. 7 also illustrates two right triangles: the first formed by azimuthal angle $\phi$ from the horizontal plane, particle location $x_t$, and satellite location $x_{t,n}$; the second formed by virtual angle $\phi_\Delta$ from the horizontal plane, virtual receiver location $x_t^{virtual}$ satellite location $x_{t,n}$. Given the relative distances involved it is known that $L_{t,n} \gg D$, therefore $\phi_\Delta \approx \phi$. From this assumption it follows that $$\Delta_{t,n} = \sqrt{(L_{t,n}\cos(\phi) + 2D)^2 + (L_{t,n}\sin(\phi))^2} - L_{t,n}$$

Upon simplification it can be shown that the path length difference can be approximated as $$\Delta_{t,n} \approx 2D\cos(\phi)$$

wherein D is the horizontal distance between particle position $x_t$ and the reflecting structure.

Based on the relationship above φ, which can be determined from the positions $x_t$ and $x_{t,n}$, and D are used to determine $\Delta_{t,n}$. There are multiple methods for estimating D. In situations where a detailed 3D map of the area is available, pseudorange model 215 may utilize ray tracing to determine possible reflecting surfaces given $x_t$. If only one reflective surface exists, D may be precisely calculated by finding the distance between the reflecting object and $x_t$. In this case the NLOS conditional distribution is $$f_{nlos}(r_{t,n}|x_t, \tau_t) = N(r_{t,n}|L_{t,n} + \Delta_{t,n} + c\tau_t, \sigma_r^2)$$

or $$f_{nlos}(r_{t,n}|x_t, \tau_t) = N(r_{t,n}|L_{t,n} + 2D\cos(\phi_{t,n}) + c\tau_t, \sigma_r^2)$$

However, in other embodiments, to avoid detailed ray tracing, and to increase the robustness of the model, $\Delta_{t,n}$ can be estimated as a random variable that depends on the propagation environment. For example, we may model D as a Gaussian random variable: $N(D|D_0, \sigma_D^2)$, wherein $D_0$ and $\sigma_D^2$ are selected based on general characteristics of the propagation environment. For example, for a pedestrian in an urban canyon, we might set $D_0$ to 15 meters (corresponding to a typical distance from a sidewalk to a building across the street), and $\sigma_D^2$ to 3 meters, corresponding to variations in pedestrian location on the sidewalk and street widths. In this case the NLOS conditional distribution is $$f_{nlos}(r_{t,n}|x_t, \tau_t) = N(r_{t,n}|L_{t,n} + 2D_0\cos(\phi_{t,n}) + c\tau_t, \sigma_r^2 + 4\sigma_D^2\cos^2(\phi_{t,n}))$$

In yet another embodiment, to account for the possibility of several reflecting surfaces at different distances from a hypothesized location, a more accurate model may be obtained by modeling D as a mixture of Gaussians, with means centered around distances corresponding to each major reflector. If additional robustness is desired, fewer assumptions can be made about the reflection environment by using a broad one-sided distribution (such as a Rayleigh, uniform, or log-normal distributions) designed to allow for reflections from 0 to 50+ meters with non-zero probability.

Overall Measurement Model

The GNSS position estimate model 214, SNR measurement model 212, and the pseudorange measurement model 215 can be expressed as an overall measurement model, which is non-linear and non-Gaussian. Simultaneous measurements of GNSS data, SNR data, and pseudorange data are assumed to be conditionally independent given the receiver state:

$$p(y_t, z_t, r_t | x_t, \tau_t) = p(y_t, z_t, r_t | x_t, \tau_t, o(m))$$
$$= p(y_t | x_t) \prod_n p(z_{t,n} | x_t, o(m))$$
$$p(r_{t,n} | x_t, \tau_t, o(m))$$

Thus, the overall measurement model 208 is dependent on the map occupancy probabilities $o(m) = \{p(m_i = 1)\}$, which as discussed above is treated as measurement data. It should be noted that this is not strictly an accurate model. For example, because the map is actually unknown $p(z_t|x_t, o(m))$ does not factor as $p(z_t|x_t, m)$ would. However, as a result of the binary SNR measurement model (e.g., any occupied cell counts as all cells occupied), the SNR measurement can be evaluated as follows:

$$p(z_t | x_t) = \sum_m p(z_t, m | x_t) = \sum_m p(z_t | x_t, m) p(m)$$

wherein $p(z_t|x_t, o(m))$ provides a good approximation. In addition, it is worth noting that successive $y_t$ are correlated, in part due to time correlated satellite pseudorange errors and because the measurements are generally the output of a device navigation filter.

Methods for Handling Clock Bias

Depending on the desired level of accuracy and acceptable levels of computational efficiency, various methods for incorporating clock bias τ into the pseudorange measurement model 215 may be used. As previously described the measurement model 208 can be expressed as follows $$p(y_t, z_t, r_t | x_t, \tau_t) = p(y_t|x_t) p(z_t|x_t) p(r_t|x_t, \tau_t)$$

However, including $\tau_t$ as a state variable in the model can incur additional computation time and memory usage penalties. Therefore, it may be desirable to eliminate $\tau_t$ as a state variable so that measurement model 208 would instead be expressed as $$p(y_t, z_t, r_t|x_t) = p(y_t|x_t) p(z_t|x_t) p(r_t|x_t)$$

In this alternate embodiment, clock bias T may instead be represented by a posterior density $p(\tau) = N(\tau|\tau_0, \sigma_\tau^2)$ wherein $\tau_0$ is typically the clock bias estimated by the GNSS receiver and $\sigma_\tau^2$ is the associated variance. From here the dependence of $p(r_t|x_t, \tau_t)$ on τ can be removed by integrating $$\int p(r_1, \ldots, r_{N_t}|x_t, \tau_t) p(\tau) d\tau = p(r_1, \ldots, r_{N_t}|x_t) = p(r_t|x_t)$$

this in turn results in the desired measurement model 208 $p(y_t, z_t, r_t|x_t)$. In this embodiment, the LOS and NLOS pseudorange distributions would be given by $$f_{los}(r_{t,n}|x_t) = N(r_{t,n}|L_{t,n} + c\tau_0, \sigma_r^2 + c^2\sigma_\tau^2) \text{ and } f_{nlos}(r_{t,n}|x_t) = N(r_{t,n}|L_{t,n} + 2D\cos(\phi_{t,n}) + c\tau_0, \sigma_r^2 + c^2\sigma_\tau^2)$$

respectively, where D is calculated by ray tracing. In embodiments where D is estimated using a Gaussian, the NLOS distribution is given by $$f_{nlos}(r_{t,n}|x_t) = N(r_{t,n}|L_{t,n} + 2D_0\cos(\phi_{t,n}) + c\tau_0, \sigma_r^2 + 4\sigma_D^2\cos^2(\phi_{t,n}) + c^2\sigma_\tau^2)$$

When clock bias is included as a state variable for each particle, there are at least two possible implementations. In both cases, $\tau_{t-1}$ is propagated to $\tau_t$ using a Kalman filter. In some embodiments, the Kalman filter uses a Gaussian random walk from $\tau_{t-1}$ to predict $\tau_t$ before accounting for measurement error: $\tau_t = \tau_{t-1} + N(0, \sigma_\tau^2)$. The variance $\sigma_\tau^2$ of the Gaussian random walk may be based on the variance of a set of representative estimates obtained by GNSS receivers. For the first implementation, the Kalman filter adjusts $\tau_t$ for measurement error using the GNSS estimate of τ at time t. However, as previously discussed, the GNSS estimate of τ is sensitive to errors in pseudorange estimates, which are often caused by urban obstructions. Therefore, it may be desirable to utilize a measurement source that is less prone to systematic errors.

Figure 6:
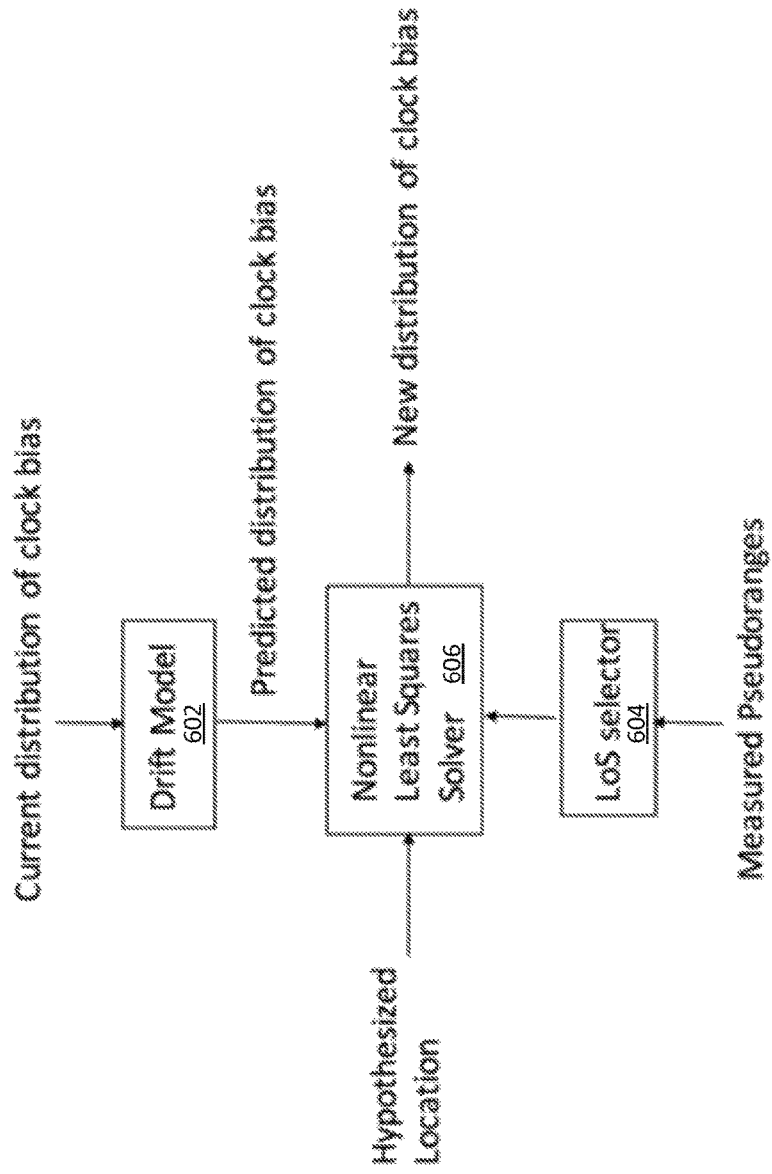
FIG. 6 is a block diagram of a system to estimate a clock bias distribution in accordance with one embodiment.

An alternative measurement source is to use measured pseudoranges $r_t$ and select pseudoranges that are likely to be LOS (e.g., based on the previous described shadow matching and SNR model). Alternatively, the influence of each pseudorange on the calculation of τ could be adjusted or weighted based on the LOS likelihood p. Once at least four LOS pseudoranges have been selected from $r_t$, a measurement τ can be recalculated assuming hypothesized particle location $x_t$ is the true position. FIG. 6 is a block diagram illustrating a clock bias mode 6001 of this type.

The clock bias model 600 of FIG. 6 includes a drift model 602, a LOS selector 604, and a non-linear least squares solver 606. The drift model 602 takes in the previously estimated distribution of clock bias and outputs a predicted distribution based on typical drift characteristics in the timing mechanism of a user device. The LOS selector 604 determines, based on the shadow matching and SNR model, which satellites are likely to be LOS. The non-linear least squares solver 606 then recalculates a distribution of clock bias based on the LOS pseudoranges, the hypothesized particle positions and the predicted distributions from the drift model 602.

In a further example embodiment, instead of recalculating τ on a per particle basis using location $x_t$, τ may be tracked using a separate filter. In this case, a measurement τ is recalculated using LOS pseudorange estimates reported by the GNSS receiver and the mean hypothesized particle location.

The preceding description corresponds to maintaining a separate clock bias distribution for each particle. Alternatively, after each measurement update, a weighted average of the clock bias distributions across particles may be taken for the next update. For a Gaussian clock bias distribution per particle, this would result in a mixture of Gaussians, which may be reapproximated as a Gaussian by mean and variance matching. In essence, this also corresponds to a separate filter for tracking clock bias, which exploits the output of the particle filter for tracking location. The new distribution of clock bias can then be fed back into the particle filter for location tracking.

Joint Modeling of Pseudorange and SNR

Since both the SNR and the pseudorange models are conditioned on whether or not a hypothesized location is shadowed (LOS versus NLOS), one way to combine these observations is to model pseudorange and SNR jointly. Thus, $$p(z_{t,n}, r_{t,n} | x_t) = p_n(LoS | x_t) f_{los}(r_{t,n} | x_t) f_{los}(z_{t,n} | x_t) + p_n(NLoS | x_t) f_{nlos}(r_{t,n} | x_t) f_{nlos}(z_{t,n} | x_t)$$

for the case where we average out the uncertainty in clock bias to obtain $p(r_{t,n}|x_t)$. If we maintain the conditioning on clock bias in the pseudorange measurement model, in the form of $p(r_{t,n}|x_t, \tau_t)$, then $$p(z_{t,n}, r_{t,n} | x_t, \tau_t) = p_n(LoS | x_t) f_{los}(r_{t,n} | x_t, \tau_t) f_{los}(z_{t,n} | x_t) + p_n(NLoS | x_t) f_{nlos}(r_{t,n} | x_t, \tau_t) f_{nlos}(z_{t,n} | x_t)$$

In both of the above cases, $r_{t,n}$ and $z_{t,n}$ are assumed to be conditionally independent given whether or not the hypothesized location is shadowed. When pseudorange and SNR are modeled jointly, the overall measurement model 208 can be given by $$p(y_t, z_t, r_t | x_t, \tau_t) = p(y_t | x_t) p(r_t, z_t | x_t, \tau_t)$$

The Non-Linear Filter

Various types of non-linear filters 206 may be utilized to determine location based on the received GNSS data, SNR data and respective measurement models 208 and motion models 210. However, because the measurement model 208 is non-linear and non-Gaussian, a type of non-linear filter known as a particle filter (PF) may be utilized. In general, a PF operates by generating a posterior distribution of the state by putting weights at a set of hypothesized state values, or particles. The particles are propagated probabilistically to obtain a new set of particles and weights at time t+1 based on the dynamics of the motion model 210, and the new set of measurements (e.g., GNSS, SNR measurements). As described in more detail with respect to FIGS. 3 and 4, embodiments described herein may make use of several different types of particle filters such as a modified bootstrap particle filter and a more advanced particle filter. While the bootstrap PF is simple to implement, one disadvantage is that it does not utilize the latest measurements to predict possible particle locations. Rather, particles are drawn from the motion model, which can result in particles being trapped in local maxima of the posterior distribution. The advanced PF overcomes these shortcomings by sampling from distributions that take into account the most current measurements, and may include a particle reset function in which particles are sampled from a likelihood surface rather than being confined to the results of the motion model. As a result, the advanced PF is able to explore the 3D (or 2D) space outside of the confines of the motion model 210, which helps avoid trapping of particle locations in local maxima, thereby yielding significant system robustness.

Figure 3:
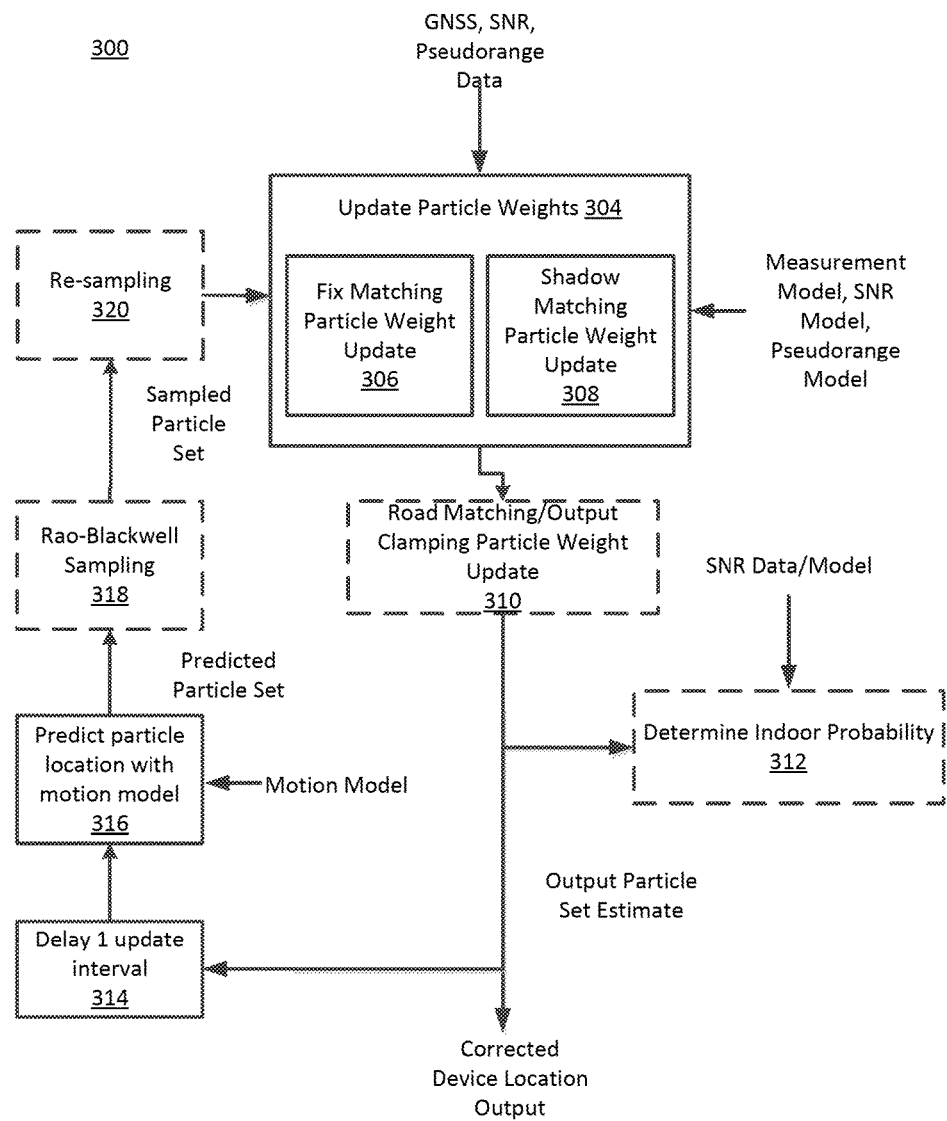
FIG. 3 is a flowchart that illustrates steps performed by the localization server using a bootstrap particle filter in accordance with one embodiment.

FIG. 3 is a flowchart that illustrates one method 300 of determining user position that utilizes the bootstrap PF. Steps that are optional are illustrated using dashed boxes. However, the use of dashed boxes for optional steps does not imply that boxes illustrated in solid lines are necessarily required in each embodiment. In general, method 300 provides a probabilistic framework for determining/improving the location estimate generated by the user device that accounts for both modeling uncertainties and measurement noise. Inputs provided to method 300 include GNSS data, SNR, and pseudorange data provided by the user device, wherein SNR and pseudorange data is provided with respect to each satellite with which the device is communicating.

Prior to a first iteration, a particle set is initialized based on the received GNSS, SNR, and pseudorange data. In one embodiment, initialization includes sampling particles from an arbitrary distribution q(•) centered on the position provided by the GNSS data. Afterwards, each particle location x is weighted by the ratio p(x)/q(x), where p(•) represents an evaluation of the measurement model 208 using the initial measurement data. In subsequent iterations, the sample set of particles (e.g., PF Point set) is provided by the motion model 210.

For purposes of this discussion, it is assumed that at least one iteration has already been performed. An output particle set is generated that includes a plurality of weighted particles, each weighted particle representing a potential location of the user device, when the magnitude of the weight indicates the likelihood (with heavier weights indicating a higher likelihood than lower weights). A motion model is utilized at step 316 (described in more detail below) to predict the location of the particles in the next time-step, which results in generation of particle position distributions and velocity distributions representing possible position/velocity estimates for each particle. At step 318, some form of sampling is provided (e.g., Rao-Blackwell sampling) to reduce particle position distributions to a point for subsequent analysis by shadow matching techniques. The sampled particle set is then provided to step 304 to update particle weights via fix matching and shadow matching techniques.

At step 304 measurement models are utilized to update particle weights associated with a provided PF particle set based on newly received measurement data, including at least GNSS fix, SNR, and pseudorange data and corresponding measurement models.

In particular, at step 306 the received GNSS fix data is compared to the plurality of proposed particles included in the PF particle set. Weights are then assigned to those particles based on how likely they are in view of the new GNSS data. This step is referred to as fix matching because it relies on the most recently acquired GNSS fix or position information. However, as discussed above the presence of strong reflections may be prevalent in built-up environments and may distort the received GNSS data. To mitigate the effect of reflections in distorting the GNSS fix data, an adaptive outlier model, described above, may be utilized wherein the outlier probability a is coarsely adapted based on the environment (e.g., adjusted based on the environment, with the value of a increasing for more built-up environments likely to generate more outlier conditions). In this way, the GNSS position estimate can be given less weight when the user is located within an environment assigned a high value of a (e.g., built-up environment) to account for the likely errors generated as a result of strong reflections. As a result the weights generated by other measurement models—such as the SNR measurement model 212 and the pseudorange measurement model—have greater influence.

In addition to problems of strong reflections, GNSS fixes sometimes exhibit an attractor or correlation problem. In particular, in response to a user remaining stationary for a period of time (e.g., few seconds), and because the GNSS measurements are assumed to be independent identically distributed (iid) Gaussian, the PF filter can be attracted or drawn towards the erroneous—and stationary—GNSS estimate, even when inconsistent with the shadow matching SNR and pseudorange estimates. In one embodiment, step 306 further utilizes a decorrelation model that de-emphasizes particle weights deduced from noisy GNSS. In general, successive fixes which overlap more are determined to be more correlated. By estimating the overlap parameter $o_t \in [0,1]$ at each time t, the GNSS position estimate model can be re-written to incorporate a decorrelation model $$y_t = Hx_t + (1-o_t)e_t + o_t n_t$$

where $n_t$ is a very broad, elliptically bounded uniform density centered at zero. As the overlap $o_t \to 1$ and $p(y_t|x_t)$ is constant in a large region, and successive fixes do not impact particles in this region, effectively mitigating successive GNSS updates. Conversely, as $o_t \to 0$ the original fix density is recovered, which allows the GNSS position estimate to take advantage of the new information. In this way, fix matching particle weight updates provided at step 306 may make use of one or more models, such as the adaptive outlier model and decorrelation model to improve the quality of the particle weights assigned.

At step 308, particle weights are similarly updated based on the received SNR and pseudorange measurements. As described above with respect to the SNR measurement model 212 and pseudorange measurement model 215, shadow matching provides a mechanism for further identifying how likely it is a user device 102 is located at a particular particle position based on the SNR measurements $z_t$ monitored by the user device with respect to the plurality of available satellites. In addition, various shadow matching techniques—including a lightweight shadow matching technique—may be utilized to update particle weights based on the received SNR and pseudorange data. In particular, a benefit of utilizing the lightweight shadow matching technique is that it does not require complex or complete 3D maps of the urban environment and is computationally less expensive while still providing good overall performance.

The particle weight updates generated by fix matching and shadow matching as part of step 304 can be expressed as $$w_t^{(k)} \propto w_{t-1}^{(k)} p(y_t, z_t, r_t | x_t^{(x)}, \tau_t^{(k)})$$

which illustrates that the updated weight is a function of the previous weight and the probability of the user device being located at particle $x_t^{(k)}$ with clock bias $\tau_t^{(k)}$ given the most recent SNR measurement $z_t$, pseudorange measurement $r_t$, and position fix measurement $y_t$. Although made explicit, the order in which particle weight updates are made at step 304 (e.g., calculation of fix matching particle weights first, or shadow matching particle weights) can be changed, as the resulting weights are multiplied with one another to generate the combined particle weight updates. In addition, in one embodiment particle weight updates are only calculated in response to updated or current measurement data. For example, if updated GNSS data is received, but no updated SNR data is received, then particle weights may be updated based only on the fix matching particle weight update, with the shadow matching particle weight update skipped until updated SNR data becomes available, and vice versa. In this embodiment, particle weight updates reflect receiving updated or new measurement data.

The output of the particle weight update provided at step 304 is a nominal output particle set, which can be utilized to determine a point estimate identifying the estimated location of user device 102 based on a minimum mean square error (MMSE) defined as:

$$\hat{x}_t = E(x_t) = \sum_k w_t^{(k)} x_t^{(k)}$$

In addition, the uncertainty associated with the estimate location is defined as the radius around $\hat{x}_t$ that captures, e.g., 68% of the particle mass. In some embodiments, this is the output provided to the user device to improve localization of the user device. In other embodiments additional operations may be performed on the nominal output particle set generated at step 304. For example, in one embodiment the nominal output particle set is further analyzed using a road matching particle weight update at step 310. The road matching model adds as an additional measurement vector to the measurement model 208 possible street assignments that vary by particle location. In some ways, road matching provided at step 310 is functionally similar to any other measurement and can be inserted directly into the PF alongside the fix matching particle weight update and shadow matching particle weight update. However, in the embodiment shown in FIG. 3 the implementation is simplified by operating the nominal PF update, and then performing a road matching update on the nominal output particle set. The likelihood that a vehicle is driving down a particular street is a function of its proximity to that street. The position likelihood can therefore be defined as a function of the distance to the street centerline $l(s_{t,i}^{(k)})$.

$$f_{pos}(s_{t,i}^{(k)} | x_t^{(k)}) = f\left(\frac{\|x_t^{(k)} - l(s_{t,i}^{(k)})\|}{\lambda(s_{t,i}^{(k)})}\right)$$

wherein $\lambda(\ )$ maps to the street width.

In this embodiment, the weights targeting the posterior distribution at time t are, for particle k, given by $$w_t^{(k)} \propto \tilde{w}_t^{(k)} p(s_{t,i}^{(k)}|x_t^{(k)})$$

where $\tilde{w}_t^{(k)}$ is the weight obtained after applying the non-road matching PF update. The weights are then (as usual) normalized to sum to one.

In one embodiment, the road matching provided at step 310 further utilizes output clamping to prevent GPS fixes from providing an output that jumps between different streets or otherwise undermines confidence in the position estimate/fix.

In addition, at step 312 the nominal output particle set (updated at step 304 as part of the updating of particle weights or additionally at step 310 as part of the road matching) is utilized to determine whether the user is located indoors. The determination of whether the user device is located indoors is based on review of the SNR measurements to determine the probability that all SNR measurements are NLOS. If all satellites are determined to be NLOS, this is indicative that the user has moved indoors and an appropriate output can be generated. In some embodiments, large changes in pseudorange estimates in a short period of time may also be used to indicate that a user has moved indoors.

As described briefly above, steps 314-320 describe how particles included in the output particle set estimate (e.g., current update) are propagated in time to generate a predicted particle set, which is sampled to provide an PF point set that is provided in feedback to aid in the updating of the particle weights at step 304.

In particular, at step 314 the output particle set estimate is delayed for a length of time corresponding with the update interval (e.g., 1 second, 10 seconds, etc.). Following the delay at step 314, the output particle set estimate identified as corresponding to the present or current update is now designated as corresponding to the previous update.

At step 316, the motion model is utilized to predict particle locations based on the output particle set. As described above, the motion model generates a predicted particle set representative of this update (e.g., current update). In the bootstrap PF, the predicted particle set for the kth particle, $q(x_t|x_{t-1}^{(k)})$ is taken to be the motion predicted distribution, which for the nominal linear Gaussian model leads to $$x_t^{(k)} \sim q(x_t|x_{t-1}^{(k)}) = p(x_t|x_{t-1}^{(k)}) = N(x_t|\Phi_t x_{t-1}^{(k)}, \Phi_t A_{t-1}\Phi_t^T + Q_t)$$

At step 318, the predicted particle set is sampled using Rao-Blackwell sampling to select a sampled particle set from the motion predicted distribution. In particular, the motion model generates with respect to each particle location a distribution of possible locations predicted in the future time step, along with a distribution of possible velocities. The Rao-Blackwell sampling provides a mechanism for restricting the motion predicted distribution generated at step 316 to a point mass that can be utilized as an input to the shadow matching particle weight update at step 308. One of the benefits of utilizing the Rao-Blackwell sampling is that it is a linear calculation (along with motion model utilized to predict particle locations). The Rao-Blackwell sampling does not sample velocity distributions, but rather allows predicted velocity distributions created by the motion model] to be updated using standard conditional Gaussian equations. In other embodiments, other sampling techniques may be utilized to select point masses from the motion predicted distributions.

Optionally, at step 320, the particles are re-sampled as necessary to avoid particle collapse. In general, particle re-sampling at step 320 allows low weight particles (e.g., particles with a very low probability of representing a possible user location) to be removed from the particle set to prevent subsequent analysis of these particles. Depending on a confidence associated with generated models, particle re-sampling at step 320 does not need to be performed at every iteration, and for highly confident models may be performed somewhat infrequently. In one embodiment re-sampling at step 320 is optionally performed if the effective sample size $$K_t = \left(\sum_k \left(w_t^{(k)}\right)^2\right)^{-1}$$

is below a threshold. The resulting PF point set is provided to step 304 to be updated based on the most recently received measurement data (GNSS fix, SNR, pseudorange).

Figure 4:
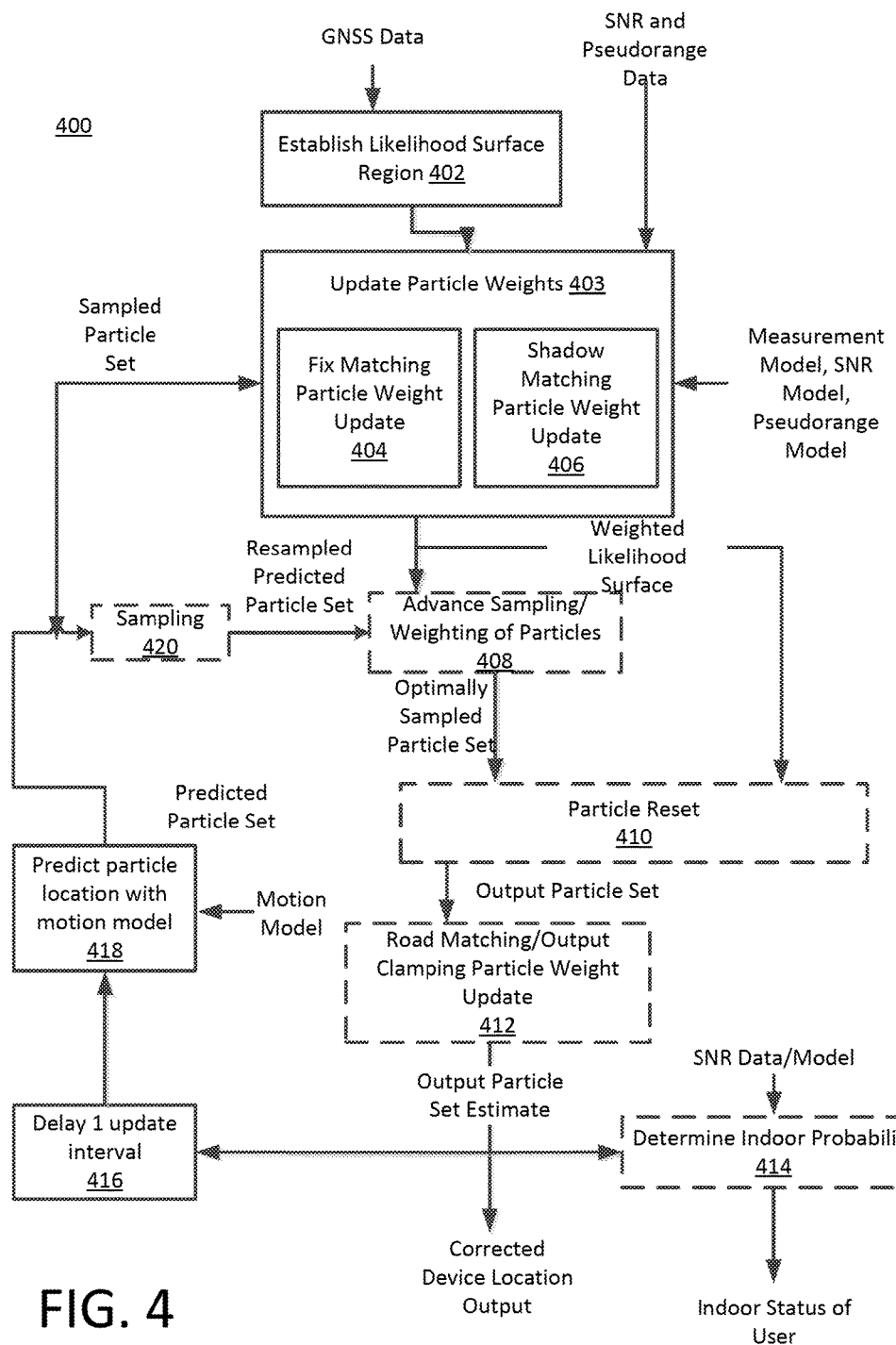
FIG. 4 is a flowchart that illustrates steps performed by the localization server using an advanced particle filter in accordance with one embodiment.

FIG. 4 is a flowchart that illustrates a method 400 of determining user position, according to one embodiment, that utilizes an advanced PF. Steps that are optional are once again illustrated using dashed boxes. However, the use of dashed boxes for optional steps does not imply that boxes illustrated in solid lines are required. In general, method 400 provides a probabilistic framework for determining the location of a user that accounts for both modeling uncertainties and measurement noise.

Inputs provided to method 400 include GNSS data, SNR data, and pseudorange data. One of the drawbacks of the bootstrap PF described with respect to FIG. 3 is that particles are drawn from the output of the motion model 210, which may result in particles becoming trapped in local maxima of the posterior distribution (which is particularly common in urban environments). The advanced PF described with respect to FIG. 4 overcomes this shortcoming by sampling from an optimal proposal distribution that takes into account the current measurements, as opposed to sampling from the motion model 210. A benefit of sampling particles in this way is that it allows particles to be drawn from a wider range of possibilities than if constrained to sampling from the motion model 210. In this way, the advanced PF samples particles in a way that allows additional particle locations to be analyzed (e.g., allows the particles to explore the 3D space more freely) and therefore avoids particles becoming trapped in locations due to the inability of the particles to escape the confines of the motion model 210.

In particular, at step 402 the advanced PF establishes a likelihood surface (LS) based on received GNSS data. In general, the likelihood surface defines for a large area likely regions or locations where a user may be located. For example, in one embodiment the likelihood surface is created at step 402 by computing a kernelized estimate of the measurement surface with support in the 3D (x, y, and z) position space:

$$p(y_t, z_t, r_t | x_t) \approx \sum_{i=1}^{M} \rho_t^{(i)} N(x_t | \mu_t^{(i)}, \Sigma)$$

with kernel weights $$\rho_t^{(i)} = p(y_t | \mu_t^{(i)}) \prod_n p(z_{t,n}, r_{t,n} | \mu_t^{(i)})$$

and circular bandwidths $\Sigma = \sigma^2 I$ that define the spread/size of the likelihood surface. In one embodiment, kernel centers $\{\mu_t^{(i)}\}_{i=1}^{M}$ are generated on a regular lattice (e.g., face centered cubic lattice) with inter kernel distances on a meter scale (e.g., 1-2 meters), and selected as the union of ellipses/ellipsoids around the GNSS position fix and motion predicted particle set (generated at step 418 by the motion model). The size of the ellipses/ellipsoids may be varied based on a trade-off between computational complexity and breadth of particles to include for analysis. The larger the ellipse, the greater the intersection between the respective ellipses surrounding the GNSS position fix and motion predicted particle set, and the larger and more computationally complex the generated likelihood surface becomes). In one embodiment, the size of the ellipses/ellipsoids is selected to represent approximately five sigma deviation around the GNSS position fix and particles included in the motion predicted particle cloud.

Having established the LS at step 402, particle weights are updated at step 403 via fix matching particle weight updates provided at step 404 and shadow matching particle weight updates provided at step 406. As discussed above with respect to FIG. 3, GNSS fix matching particle weight update may utilize on one or more of the adaptive outlier model and the decorrelation model to determine the weight or influence to be given the GNSS position fix data. In other embodiments, the adaptive outlier model and/or decorrelation model may be implemented as part of establishing the likelihood surface region at step 402. Similarly, shadow matching particle weight update is provided at step 406 using the SNR model 212 and pseudorange model 215. Both the fix matching particle weight update and the shadow matching particle operate in much the same way as described with respect to the bootstrap PF shown in FIG. 3, with the likelihood surface being utilized as the particle filter point set. The outputs of the fix matching particle weight update and shadow matching particle weight update provided at steps 404 and 406 are multiplied together to generate a weighted likelihood surface. At step 408, the weighted likelihood surface may be optionally sampled/weighted based on the motion-predicted distribution generated by the motion model at step 418 (and optionally resampled at step 420).

The resulting particle proposal distribution is expressed as:

$$q(x_t | x_{t-1}^{(k)}, y_t, z_t, r_t) \approx \frac{1}{Z} N(x_t | \Phi_t x_{t-1}^{(k)}, \Phi_t A_{t-1} \Phi_t^T + Q_t) \sum_{i=1}^{M} \rho_t^{(i)} N(x_t | \mu_t^{(i)}, \Sigma)$$

The first portion of this equation, $N(x_t | \Phi_t x_{t-1}^{(k)}, \Phi_t A_{t-1} \Phi_t^T + Q_t)$, represents the motion-predicted distribution generated by the motion model at step 418, and is identical to the motion predicted distribution utilized in the bootstrap PF. The latter portion of this equation represents the weighted likelihood surface generated at step 403. The addition of the likelihood surface term provides for samples to be drawn from outside those particles proposed by the motion model and prevents particles from becoming trapped in local maxima if only the first term was utilized. Particle weights may (optionally) be calculated at step 408 as follows:

$$w_t^{(k)} \propto w_{t-1}^{(k)} \int p(x_t | x_{t-1}^{(k)}) p(y_t, z_t, r_t | x_t) dx_t$$

where the integral evaluates (approximately) to the sum of the weights of the Gaussian mixture for q(•), and represents a combination of the motion predicted particle set estimate calculated at step 418 (and optionally sampled at step 420) and the weighted likelihood surface calculated at steps 402 and 403. In one embodiment, because products of Gaussian distributions are themselves Gaussian, sampling from this distribution for each value k becomes a Rao-Blackwellized sampling from the Gaussian mixture q(•). Specifically, each particle selects a likelihood surface kernel location at random, with particle k selecting kernel i with probability proportional to $$\int N(x_t | \Phi_t x_{t-1}^{(k)}, \Phi_t A_{t-1} \Phi_t^T + Q_t) \cdot \rho_t^{(i)} N(x_t | \mu_t^{(i)}, \Sigma) dx_t$$

Note that this expression is easy to evaluate due to the fact that the product of two Gaussian distributions is itself a (un-normalized) Gaussian distribution, and because any probability distribution integrates to one by definition. In this embodiment, particle k then assumes the position distribution $N(x_t | \mu_t^{(i^*)}, \Sigma)$ where i* is the index of the selected likelihood surface kernel. The non-position coordinates' distribution is then set according to the normal rules of Rao-Blackwellized (conditional Gaussian) sampling. Although this type of sampling is not difficult, it is computationally expensive: kernel selection probabilities is computed for each kernel-particle pair, yielding a computational complexity of O(KM) where M is the number of likelihood surface kernels and K is the number of particles. Therefore, in one embodiment the sampling is modified to recognize that for clusters of nearby particles the vast proportion of proposed kernel densited estimated (KDE) kernel selection probabilities are very small, due at least in part to motion constraints. Hence, in general, for a cluster of particles only a small number M'>>M of the total likelihood kernels is examined. This observation can be utilized by using a KD tree clustering on the particles and box and bound technique to provide an upper bound on the kernel selection probabilities by a small number (e.g., $10^{-6}$) for a given cluster of particles, and then prune those kernels from that clusters version of the KDE (likelihood surface). These operations may be performed in parallel across the plurality of clusters. Depending on the in-cluster particle spread, volume of the KDE support, firmness of motion constraints, etc., the complexity of the sampling operation may be reduced significantly. In another embodiment, KD trees for both the particles and likelihood surface are created (as opposed to just the likelihood surface), and computational efficiency is further improved.

In this way, advanced sampling/weighting of particles at step 408 may be utilized to generate an optimally sampled particle set, wherein the optimally sampled particle set may be provided as the particle set estimate, or may optionally be provided as an input to one or more additionally optional steps (e.g., particle reset at step 410, road matching/output clamping at step 412). These steps may be performed alone or in combination with one another.

In one embodiment, particle reset at step 410 allows a portion of the particles to be sampled from the likelihood surface (rather than from the motion model). In particular, because of the KDEs generated at step 402 as part of the likelihood surface, a portion of these particles can be sampled directly from the likelihood surface. The benefit of selecting particles directly from the likelihood surface is that it encourages the particle filter to explore different parts of the environment. In particular, localization space is often multimodal, and particle resetting in this manner encourages the particle filter to explore different locations and track more modes in the localization space.

In addition, at step 412 a road matching/output clamping operation may be performed. Road matching at step 412 operates in the same manner as road matching provided in the bootstrap PF. In general, road matching at step 412 adds as an additional measurement vector to the measurement model 210 possible street assignments which varies by particle location. The result of road matching is modification of the particle weights assigned by fix matching particle weight update or the shadow matching particle weight update. In one embodiment, road matching is inserted directly into the PF alongside the fix matching particle weight update and/shadow matching particle weight update. However, in the embodiment shown in FIG. 4 (as well as FIG. 3) the implementation is simplified by operating the normal PF update, and then performing a road matching update on the nominal output particle set. In this embodiment, the weights targeting the posterior distribution at time tare, for particle k, given by $$w_t^{(k)} \propto \tilde{w}_t^{(k)} p(s_{t,i}^{(k)} | x_t^{(k)})$$

where $\tilde{w}_t^{(k)}$ is then weight after applying the non-road matching PF update. The weights are then (as usual) normalized to sum to one.

In addition, at step 414 the nominal output particle set (with or without road matching) is utilized to determine whether the user is located indoors. As discussed above with respect to 312, the determination of whether the user device is located indoors is based on review of the SNR measurements to determine the probability that all SNR measurements are NLOS. If all satellites are determined to be NLOS, this is indicative that the user has moved indoors and an appropriate output can be generated.

In addition, the advanced PF provides the particle set estimate output (e.g., current update) in feedback to steps 416-420 in order to generate a predicted particle set. In particle, at step 416 a one update delay is introduced such that the particle set estimate output (current update) becomes the previous update as additional measurement data becomes available. For example, in one embodiment the delay value is set equal to approximately one second.

At step 418, the motion model is utilized to generate a predicted particle set estimate. The motion model utilized in the advanced PF operates in the same way as described with respect to the bootstrap PF. In particular, the motion model 210 generates a predicted particle set that represents how particles are predicted to propagate in a single time step. Once again, the predicted particle set for the kth particle, $q(x_t | x_{t-1}^{(k)})$ is taken to be the motion predicted distribution, which for the nominal linear Gaussian model leads to $$x_t^{(k)} \sim q(x_t | x_{t-1}^{(k)}) = p(x_t | x_{t-1}^{(k)}) = N(x_t | \Phi_t x_{t-1}^{(k)}, \Phi_t A_{t-1} \Phi_t^T + Q_t)$$

At step 420, the predicted particle set estimate is provided in feedback to step 402 to establish the likelihood surface in the next time step. In addition, the predicted particle set estimate may be provided in feedback—via resampling step 420—to advance sampling/weighting step 408 as described above in generation of the optimally sampled particle set.

Shadow Caching

FIG. 5 is a flowchart that illustrates steps performed by the localization server using joint shadow, SNR, and pseudorange matching in accordance with one embodiment. In order to efficiently perform the above described shadow matching algorithms. The localization server receives the GNSS data of the latest position fix for the user device. Upon receiving the GNSS data, the localization server identifies the satellites for which the user device received a signal. The GNSS receiver typically reports this data along with the position fix and other data. The localization server then looks up 502 the current location of each satellite contributing the GNSS position fix using publically available orbit, ephemeris, or almanac data and the timestamp provided by the GNSS receiver. After determining the GNSS fix location of the user device and the positions of the GNSS satellites contributing to the fix, the localization server retrieves 506 shadow maps for each of the identified satellites from the shadow cache 504. The shadow cache 504 is a database maintained by the localization server which stores shadow map data indexed by satellite location and GNSS fix location. Because GNSS satellites have predictable orbits it is possible to maintain an approximate shadow map for each position a satellite might occupy. Each shadow map is comprised of blockage probabilities based on map occupancy probabilities o(m) corresponding to an area surrounding the original GNSS position fix.

After retrieving the shadow map, blockage probabilities are computed 510 for each particle in the bootstrap PF or for the likelihood surface of the advanced PF.

While the localization server is retrieving 506 the shadow maps for each satellite, the localization server evaluates 508 the above discussed SNR and pseudorange models using the SNR and pseudorange data from the latest GNSS fix. The results of the models are NLOS and LOS probabilities for the pseudorange model and NLOS and LOS probabilities for the SNR model for each satellite contributing the GNSS fix.

Finally, the localization server combines the per-satellite blockage probabilities with the per-satellite NLOS and LOS likelihoods for the SNR model, and the per-satellite NLOS and LOS likelihoods for the pseudorange model to compute and apply shadow matching weights 512. The result is a shadow matched particle set or likelihood surface for the bootstrap PF and advanced PF respectively.

Optional Measurement Models

Carrier Phase Model

Satellite carrier phases provide an additional source of information about location, which can potentially enable attaining sub-wavelength precision and may be reported by a GNSS receiver. Since phases are measured modulo $2\pi$, the carrier phase measurement induces a multimodal distribution on the range, with peaks spaced by the carrier wavelength. Other than this, carrier phase measurements can be accommodated in the particle filtering framework in exactly the same or similar fashion as pseudoranges. The clock bias needs to be tracked more precisely to utilize carrier phase, hence joint tracking of location, velocity and clock bias (per particle) may be required.

In an alternative embodiment, the reported carrier phase estimates may be applied using standard real time kinematic techniques after a corrected position and clock bias estimate have been provided using the methods described above.

Doppler Shift Model

In some cases, GNSS receiver may report the Doppler shift of the signal. This information may be incorporated in the motion model 210 as it may provide additional information regarding the velocity of the user device.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for determining a location of a user device, the method comprising:
   receiving, from a satellite system, a first data point of GNSS, SNR, and pseudorange data at a GNSS receiver included in the user device, wherein the satellite system includes a plurality of satellites;
   initializing a first particle set based on the first data point, wherein each particle in the first particle set represents a hypothetical location of the user device;
   predicting a distribution of particle locations for each particle in the first particle set using a motion model;
   sampling the predicted distributions of particle locations for each particle in the first particle to create a second particle set, wherein each particle in the second particle set represents a hypothetical location of the user device after an update interval;
   receiving a second data point of GNSS, SNR, and pseudorange data, wherein the pseudorange data includes a plurality of pseudorange estimates, each pseudorange estimate associated with one of the plurality of satellites;
   for each particle in the second particle set:
      determining a likelihood of a signal between each of the plurality of satellites and the hypothetical location of the particle being line-of-sight and a likelihood of the signal between each of the plurality of satellites and the hypothetical location of the particle being non-line-of-sight, based on a probabilistic shadow matching estimate;
      determining a likelihood of receiving each of the plurality of pseudorange estimates at the hypothetical location conditioned on the satellite associated with each pseudorange estimate being line-of-sight;
      determining a likelihood of receiving each of the plurality of pseudorange estimates at the hypothetical location conditioned on the satellite associated with each pseudorange estimate being non-line-of-sight; and
      weighting the particle based on the determined likelihoods; and
   determining an estimate of the location of the user device based on the hypothetical location and weight of each particle in the second particle set.

2. The method of claim 1, wherein the SNR data includes a plurality of SNR values, each SNR value associated with one of the plurality of satellites; and wherein the method of claim 1 further comprises:
   for each particle in the second particle set:
      determining a likelihood of receiving each of the plurality of SNR values at the hypothetical location conditioned on the satellite associated with each SNR value being line-of-sight;
      determining a likelihood of observing each of the plurality of SNR values at the hypothetical location conditioned on the satellite associated with each SNR value being non-line-of-sight; and
      weighting the particle based on the determined likelihoods.

3. The method of claim 1, wherein the GNSS data includes a position fix estimate of a location of the user device, and wherein the method of claim 1 further comprises:
   for each particle in the second particle set:
      determining a likelihood of receiving the position fix estimate at the hypothetical location; and
      weighting the particle based on the determined likelihoods.

4. The method of claim 1, wherein initializing a first particle set based on the first data point further comprises:
   initializing a first value of a clock bias state variable for each particle in the first particle set, the clock bias state variable representing a hypothetical clock bias of the user device.

5. The method of claim 4, further comprising:
   propagating, for each particle in the first particle set, the first value of the clock bias state variable to a second value of the clock bias state variable for the second particle set using a Kalman filter utilizing a Gaussian random walk.

6. The method of claim 4, further comprising:
   propagating, for each particle in the first particle set, the first value of the clock bias state variable to a second value of the clock bias state variable for the second particle set by:
   for each particle in the second particle set:
      weighting each of the plurality of pseudorange estimates based on the determined likelihood of the satellite associated with each pseudorange estimate being line-of-sight at the hypothetical location of the particle; and
      calculating the second value of the clock bias state variable using a non-linear least squares solver and the weighted pseudorange estimates.

7. The method of claim 6, wherein calculating the second value of the clock bias state variable using a non-linear least squares solver and the weighted pseudorange estimates further comprises:
   for each particle in the second particle set:
      predicting a distribution of clock bias values, using a drift model, based on the first value of the clock bias state variable and typical drift characteristics of the user device;
      recalculating the distribution of clock bias values using the non-linear least squares solver and the weighted plurality of weighted pseudorange estimates; and
      sampling the recalculated distribution to determine the second value of the clock bias state variable.

8. The method of claim 1, wherein a clock bias of the user device is estimated on a particle set basis.

9. The method of claim 1, wherein the first data point and the second data point includes carrier phase data, wherein the carrier phase data indicates the phase of each signal received from the plurality of satellites, and wherein the method of claim 1 further comprises:
   for each particle in the second particle set:
      determining a likelihood of receiving each of the plurality of pseudorange estimates based on the phase of each signal received from the plurality of satellites; and
      weighting the particle based on the determined likelihoods.

10. The method of claim 1, wherein the first data point and the second data point includes Doppler shift data, wherein the Doppler shift data indicates the Doppler shift caused by the motion of the user device, and wherein predicting a distribution of particle locations for each particle in the first particle set using a motion model further comprises:
  utilizing the Doppler shift data to determine a distribution of velocities for the user device; and
  predicating, using the motion model, a distribution of particle locations for each particle in the first particle set based on the distribution of velocities.

11. A method for determining a location of a user device, the method comprising:
  receiving, from a satellite system, a first data point of GNSS, SNR, and pseudorange data at a GNSS receiver included in the user device, wherein the satellite system includes a plurality of satellites;
  generating a first likelihood surface based on received GNSS data of the first data point;
  weighting the first likelihood surface based on probabilistic shadow matching estimates for the first likelihood surface, wherein the probabilistic shadow matching estimates are based on the SNR and pseudorange data of the first data point;
  sampling the first likelihood surface to create a first particle set, wherein each particle in the first particle set represents a hypothetical location of the user device;
  waiting an amount of time equal to an update interval;
  receiving a second data point of GNSS, SNR, and pseudorange data, wherein the pseudorange data includes a plurality of pseudorange estimates, each pseudorange estimate associated with one of the plurality of satellites;
  predicting a distribution of particle locations for each particle in the first particle set using a motion model;
  resampling the predicted distribution of particle locations for each particle in the first particle to create a resampled particle set, wherein each particle in the resampled particle set represents a hypothetical location of the user device after an update interval;
  generating a second likelihood surface based on the first particle set and the pseudorange data of the second data point, wherein the second likelihood surface includes a plurality of kernels and wherein generating further comprises:
    for each of the plurality of kernels included in the second likelihood surface:
      determining a likelihood of a signal between each of the plurality of satellites and a location of the kernel being line-of-sight and a likelihood of the signal between each of the plurality of satellites and the location of the kernel being non-line-of-sight, based on a probabilistic shadow matching estimate;
      determining a likelihood of receiving each of the plurality of pseudorange estimates at the location of the kernel conditioned on the satellite associated with each pseudorange estimate being line-of-sight;
      determining a likelihood of observing each of the plurality of pseudorange estimates at the location of the kernel conditioned on the satellite associated with each pseudorange estimate being non-line-of-sight; and
      weighting the kernel based on the determined likelihoods;
  sampling the second likelihood surface based on the weights of the plurality of kernels and the resampled particle set to create a second particle set;
  determining an estimate of the location of the user device based on the second particle set.

12. The method of claim 11, wherein the SNR data includes a plurality of SNR values, each SNR value associated with one of the plurality of satellites; and wherein the method of claim 11 further comprises:
  for each of the plurality of kernels included in the second likelihood:
    determining a likelihood of receiving each of the plurality of SNR values at the location of the kernel conditioned on the satellite associated with each SNR value being line-of-sight;
    determining a likelihood of observing each of the plurality of SNR values at the location of the kernel conditioned on the satellite associated with each SNR value being non-line-of-sight; and
    weighting the kernel based on the determined likelihoods.

13. The method of claim 11, wherein the GNSS data includes a position fix estimate of a location of the user device, and wherein the method of claim 11 further comprises:
  for each of the plurality of kernels included in the second likelihood surface:
    determining a likelihood of receiving the position fix estimate at the location of the kernel; and
    weighting the particle based on the determined likelihoods.

14. The method of claim 11, wherein sampling the first likelihood surface to create a first particle set further comprises:
  initializing a first value of a clock bias state variable for each particle in the first particle set, the clock bias state variable representing a hypothetical clock bias of the user device.

15. The method of claim 14, further comprising:
  propagating, for each particle in the first particle set, the first value of the clock bias state variable to a second value of the clock bias state variable for the second particle set using a Kalman filter utilizing a Gaussian random walk.

16. The method of claim 14, further comprising:
  propagating, for each particle in the first particle set, the first value of the clock bias state variable to a second value of the clock bias state variable for the second particle set by:
    for each particle in the second particle set:
      weighting each of the plurality of pseudorange estimates based on the determined likelihood of the satellite associated with each pseudorange estimate being line-of-sight at the hypothetical location of the particle; and
      calculating the second value of the clock bias state variable using a non-linear least squares solver and the weighted pseudorange estimates.

17. The method of claim 16, wherein calculating the second value of the clock bias state variable using a non-linear least squares solver and the weighted pseudorange estimates further comprises:
  for each particle in the second particle set:
    predicting a distribution of clock bias values, using a drift model, based on the first value of the clock bias state variable and typical drift characteristics of the user device;

recalculating the distribution of clock bias values using the non-linear least squares solver and the weighted plurality of weighted pseudorange estimates; and sampling the recalculated distribution to determine the second value of the clock bias state variable.

18. The method of claim 11, wherein a clock bias of the user device is estimated on a particle set basis.

19. The method of claim 11, wherein the first data point and the second data point includes carrier phase data, wherein the carrier phase data indicates the phase of each signal received from the plurality of satellites, and wherein the method of claim 11 further comprises:

for each kernel in the second likelihood surface:
determining a likelihood of receiving each of the plurality of pseudorange estimates based on the phase of each signal received from the plurality of satellites and the location of the kernel; and weighting the particle based on the determined likelihoods.

20. The method of claim 11, wherein the first data point and the second data point include Doppler shift data, wherein the Doppler shift data indicates the Doppler shift caused by the motion of the user device, and wherein predicting a distribution of particle locations for each particle in the first particle set using a motion model further comprises:

utilizing the Doppler shift data to determine a distribution of velocities for the user device; and predicating, using the motion model, a distribution of particle locations for each particle in the first particle set based on the distribution of velocities.

\* \* \* \* \*

UNITED STATES PATENT AND TRADEMARK OFFICE
CERTIFICATE OF CORRECTION

PATENT NO. : 10,175,363 B2  
APPLICATION NO. : 15/659536  
DATED : January 8, 2019  
INVENTOR(S) : Madhow et al.

Page 1 of 1

It is certified that error appears in the above-identified patent and that said Letters Patent is hereby corrected as shown below:

In the Claims

Column no: 25, Line(s): 26, Claim 1: "first particle" to read as -- first particle set --

Column no: 27, Line(s): 3-4, Claim 10: "by the motion" to read as -- by motion --

Column no: 27, Line(s): 9, Claim 10: "predicating," to read as -- predicting, --

Column no: 27, Line(s): 38, Claim 11: "first particle" to read as -- first particle set --

Column no: 29, Line(s): 23, Claim 20: "by the motion" to read as -- by motion --

Column no: 29, Line(s): 29, Claim 20: "predicating," to read as -- predicting, --

Signed and Sealed this  
Twenty-third Day of July, 2019

Andrei Iancu  
*Director of the United States Patent and Trademark Office*